(12) United States Patent
Welle

(10) Patent No.: US 7,721,762 B2
(45) Date of Patent: May 25, 2010

(54) FAST ACTING VALVE APPARATUSES

(75) Inventor: Richard P. Welle, Huntington Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 1310 days.

(21) Appl. No.: 11/190,312

(22) Filed: Jul. 26, 2005

(65) Prior Publication Data

US 2005/0284511 A1    Dec. 29, 2005

Related U.S. Application Data

(63) Continuation-in-part of application No. 10/877,691, filed on Jun. 24, 2004, and a continuation-in-part of application No. 10/877,602, filed on Jun. 24, 2004.

(51) Int. Cl.
*F15C 1/04*    (2006.01)
(52) U.S. Cl. ............................................ 137/828
(58) Field of Classification Search ............. 137/828; 251/11, 129.01
See application file for complete search history.

(56) References Cited

U.S. PATENT DOCUMENTS

| | | | |
|---|---|---|---|
| 2,910,836 A | 11/1959 | Karrer | |
| 2,928,253 A | 3/1960 | Lopp et al. | |
| 3,111,813 A | 11/1963 | Blumentritt | |
| 3,197,342 A | 7/1965 | Neild, Jr. | |
| 3,397,860 A | 8/1968 | Bushmeyer | |
| 3,779,814 A | 12/1973 | Miles et al. | |
| 4,476,685 A | 10/1984 | Aid | |
| 4,938,258 A | 7/1990 | Sato | |
| 4,989,626 A | 2/1991 | Takagi et al. | |
| 5,101,848 A | 4/1992 | Kojima et al. | |
| 5,249,929 A | 10/1993 | Miller, Jr. et al. | |
| 5,603,351 A | 2/1997 | Cherukuri et al. | |
| 5,662,143 A | 9/1997 | Caughran | |
| 5,699,157 A | 12/1997 | Parce | |
| 5,795,788 A | 8/1998 | Bevan et al. | |
| 5,849,208 A | 12/1998 | Hayes et al. | |
| 5,975,856 A | 11/1999 | Welle | |
| 5,988,197 A | 11/1999 | Colin et al. | |
| 5,993,634 A * | 11/1999 | Simpson et al. | 204/612 |
| 6,007,302 A | 12/1999 | Welle | |
| 6,086,740 A | 7/2000 | Kennedy | |
| 6,100,463 A * | 8/2000 | Ladd et al. | 136/201 |
| 6,149,123 A | 11/2000 | Harris et al. | |
| 6,159,744 A | 12/2000 | Bevan et al. | |
| 6,282,907 B1 | 9/2001 | Ghoshal | |
| 6,283,718 B1 | 9/2001 | Prosperetti et al. | |
| 6,311,713 B1 | 11/2001 | Kaartinen | |
| 6,328,070 B2 | 12/2001 | Clayton et al. | |
| 6,344,325 B1 | 2/2002 | Quake et al. | |
| 6,349,740 B1 | 2/2002 | Cho et al. | |

(Continued)

OTHER PUBLICATIONS

W. Y. Sim, et al., "A phase-change type micropump with aluminum flap valves," *J. Micromech. Microeng.*, 13 (2003) 286-294 (published Jan. 29, 2003).

(Continued)

*Primary Examiner*—John Rivell
*Assistant Examiner*—Craig M Schneider
(74) *Attorney, Agent, or Firm*—Jones Day; Nicholas A. Pisano; Jaime D. Choi

(57) ABSTRACT

Embodiments of valve apparatuses are described.

39 Claims, 17 Drawing Sheets

U.S. PATENT DOCUMENTS

| | | | |
|---|---|---|---|
| 6,382,254 B1* | 5/2002 | Yang et al. ............... | 137/807 |
| 6,408,878 B2 | 6/2002 | Unger et al. | |
| 6,453,928 B1 | 9/2002 | Kaplan et al. | |
| 6,467,275 B1* | 10/2002 | Ghoshal .................. | 62/3.3 |
| 6,521,188 B1 | 2/2003 | Webster | |
| 6,536,476 B2 | 3/2003 | Ueno et al. | |
| 6,540,895 B1 | 4/2003 | Spence et al. | |
| 6,557,575 B1 | 5/2003 | Gerhardt et al. | |
| 6,561,479 B1 | 5/2003 | Eldridge | |
| 6,575,188 B2 | 6/2003 | Parunak | |
| 6,598,403 B1 | 7/2003 | Ghoshal | |
| 6,599,098 B2 | 7/2003 | Weng et al. | |
| 6,619,311 B2 | 9/2003 | O'Connor et al. | |
| 6,637,210 B2 | 10/2003 | Bell | |
| 6,658,860 B2 | 12/2003 | McGrew | |
| 6,679,279 B1 | 1/2004 | Liu et al. | |
| 6,767,706 B2 | 7/2004 | Quake et al. | |
| 6,793,753 B2 | 9/2004 | Unger et al. | |
| 6,857,449 B1 | 2/2005 | Chow | |
| 6,877,528 B2 | 4/2005 | Gilbert et al. | |
| 6,880,576 B2 | 4/2005 | Karp et al. | |
| 6,959,555 B2 | 11/2005 | Bell | |
| 6,981,522 B2 | 1/2006 | O'Connor et al. | |
| 7,008,193 B2 | 3/2006 | Najafi et al. | |
| 7,128,081 B2 | 10/2006 | Dourdeville | |
| 7,195,036 B2 | 3/2007 | Burns et al. | |
| 7,216,660 B2* | 5/2007 | Troian et al. ............. | 137/13 |
| 7,241,421 B2 | 7/2007 | Webster et al. | |
| 2002/0007858 A1 | 1/2002 | Xu et al. | |
| 2002/0029814 A1 | 3/2002 | Unger et al. | |
| 2002/0124879 A1 | 9/2002 | Kaplan et al. | |
| 2002/0127736 A1 | 9/2002 | Chou et al. | |
| 2002/0143437 A1 | 10/2002 | Handique et al. | |
| 2002/0144738 A1 | 10/2002 | Unger et al. | |
| 2002/0145231 A1 | 10/2002 | Quake et al. | |
| 2002/0148234 A1 | 10/2002 | Bell | |
| 2002/0166585 A1 | 11/2002 | O'Connor et al. | |
| 2003/0008308 A1 | 1/2003 | Enzelberger et al. | |
| 2003/0019522 A1 | 1/2003 | Parunak | |
| 2003/0019833 A1 | 1/2003 | Unger et al. | |
| 2003/0061687 A1 | 4/2003 | Hansen et al. | |
| 2003/0080442 A1* | 5/2003 | Unger .................... | 257/787 |
| 2003/0089865 A1 | 5/2003 | Eldridge | |
| 2003/0096310 A1 | 5/2003 | Hansen et al. | |
| 2003/0106799 A1 | 6/2003 | Covington et al. | |
| 2003/0152463 A1 | 8/2003 | Shuler et al. | |
| 2003/0231967 A1 | 12/2003 | Najafi et al. | |
| 2004/0073175 A1 | 4/2004 | Jacobson et al. | |
| 2004/0084647 A1 | 5/2004 | Beden et al. | |
| 2004/0086871 A1 | 5/2004 | Schembri | |
| 2004/0115731 A1 | 6/2004 | Hansen et al. | |
| 2004/0179975 A1 | 9/2004 | Cox et al. | |
| 2004/0219732 A1 | 11/2004 | Burns et al. | |
| 2004/0248167 A1 | 12/2004 | Quake et al. | |
| 2005/0247356 A1 | 11/2005 | Welle | |
| 2005/0247357 A1 | 11/2005 | Welle | |
| 2005/0247358 A1 | 11/2005 | Welle | |
| 2005/0249607 A1 | 11/2005 | Klee | |
| 2005/0260081 A1 | 11/2005 | Tanaka et al. | |
| 2005/0284526 A1 | 12/2005 | Welle | |
| 2005/0284527 A1 | 12/2005 | Welle | |
| 2007/0227592 A1 | 10/2007 | Allen et al. | |

OTHER PUBLICATIONS

R. P. Welle, B. S. Hardy, and M. J. O'Brien, "The Peltier-Actuated Microvalve," Proceedings of the 23$^{rd}$ International Conference on Thermoelectrics, Adelaide, Jul. 27, 2004.

R. P. Welle and B. S. Hardy, "Peltier-Actuated Microvalve Performance Optimization," Proceedings of the 24th International Conference on Thermoelectrics, Clemson, Jun. 2005.

Ozaki, "Pumping mechanism using periodic phase changes of a fluid," Micro Electro Mechanical Systems, 1995, MEMS '95, Proceedings, IEEE, 31-36 (Jan. 29-Feb. 2, 1995).

* cited by examiner

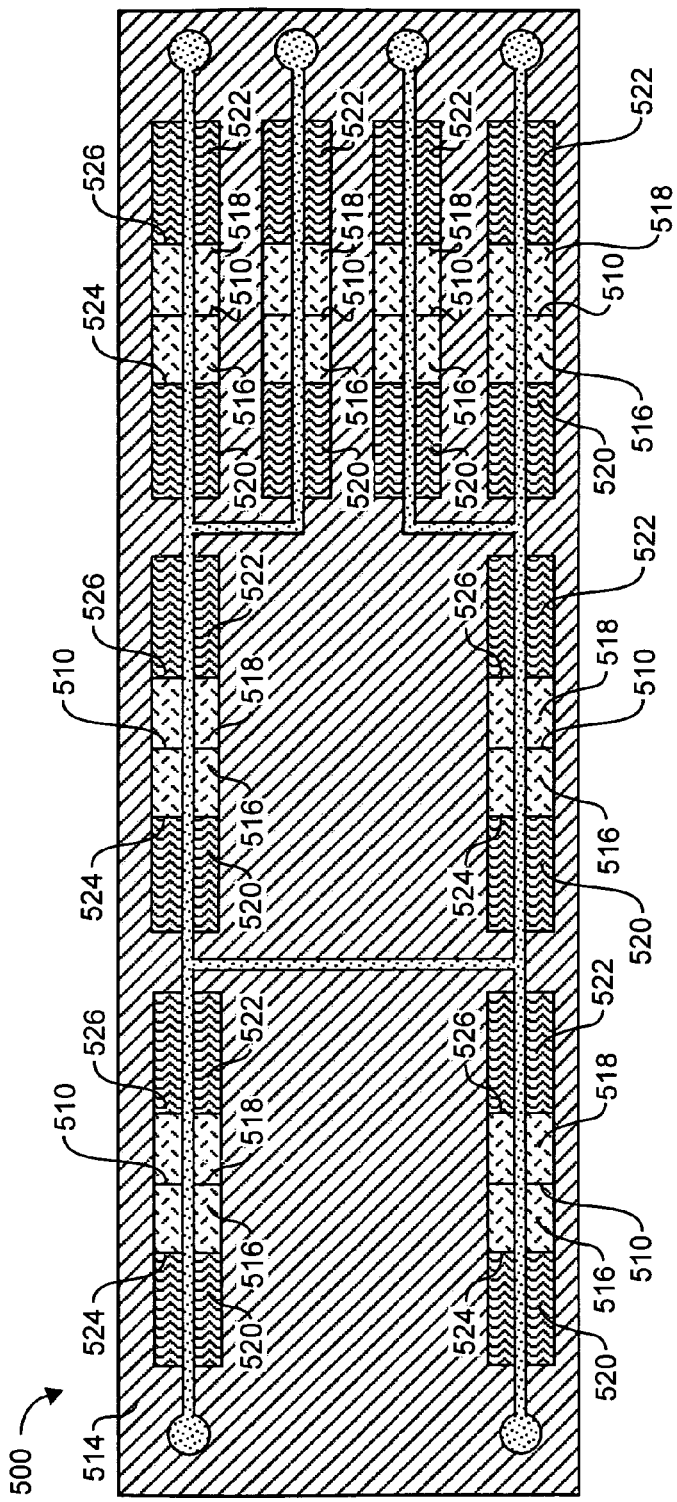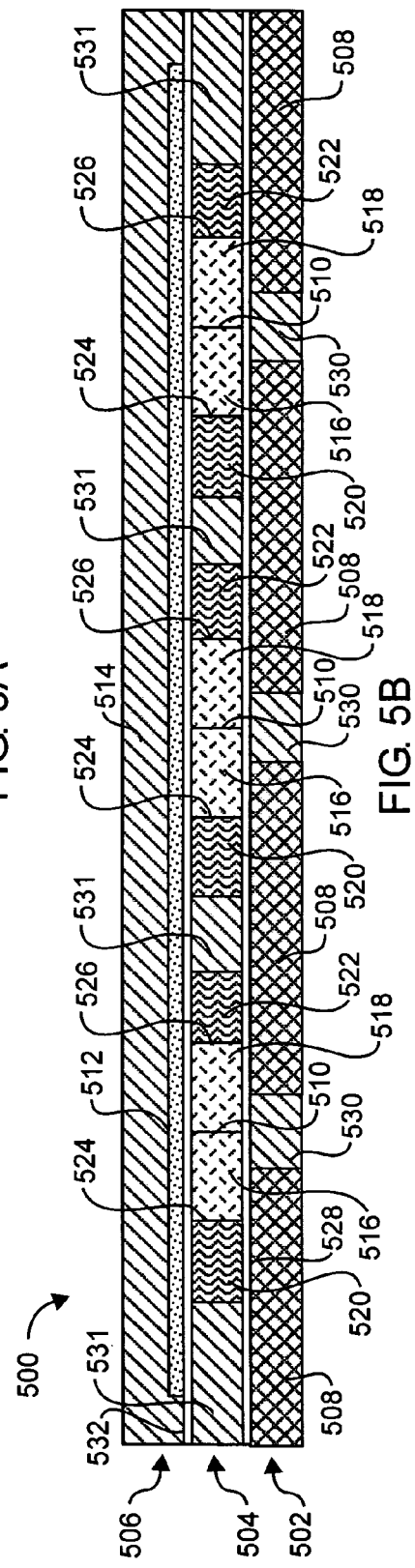
FIG. 5A
FIG. 5B

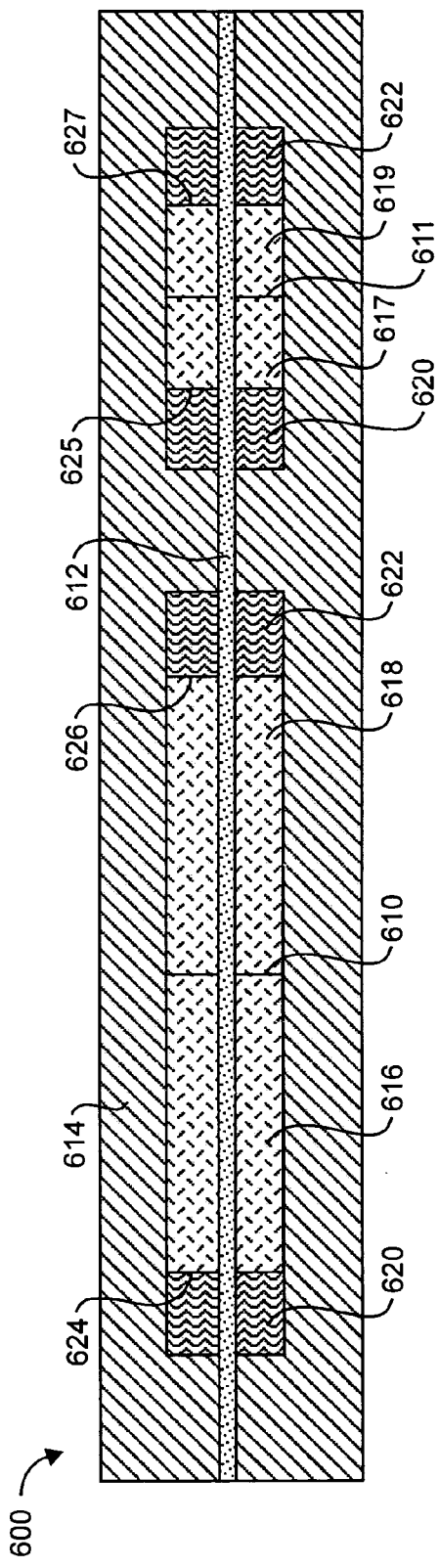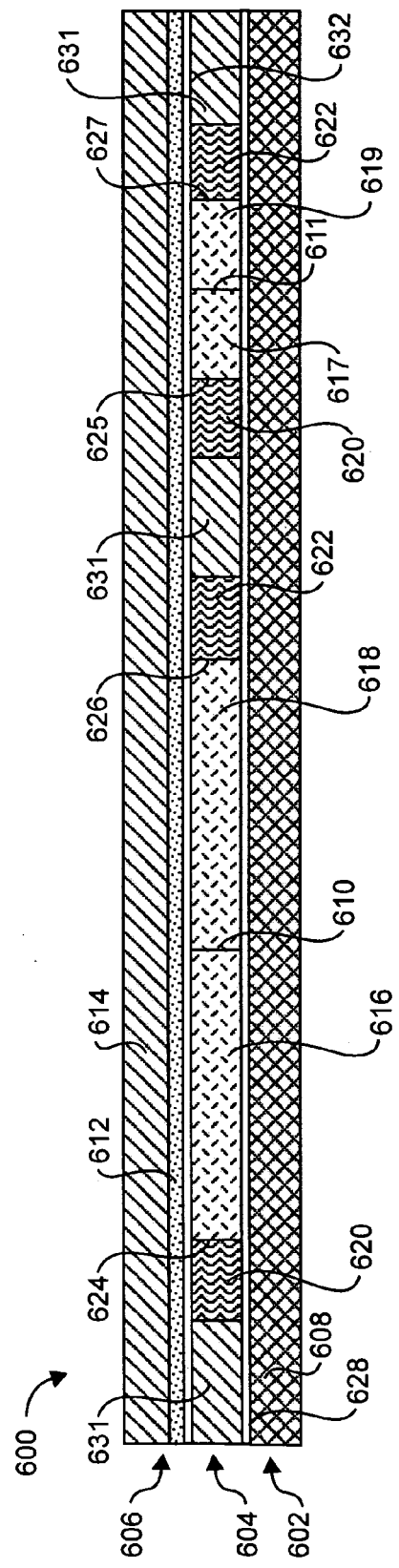

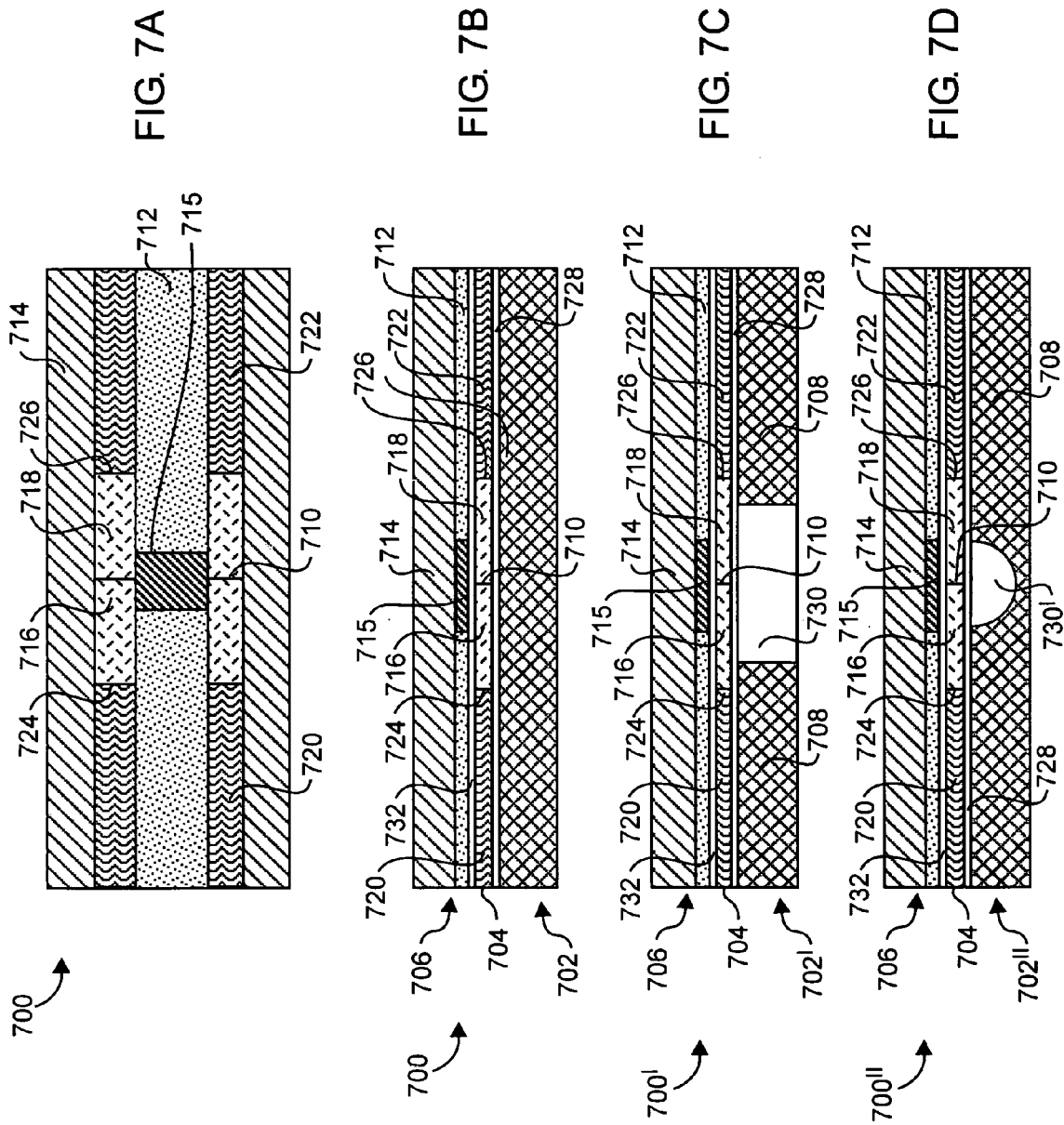

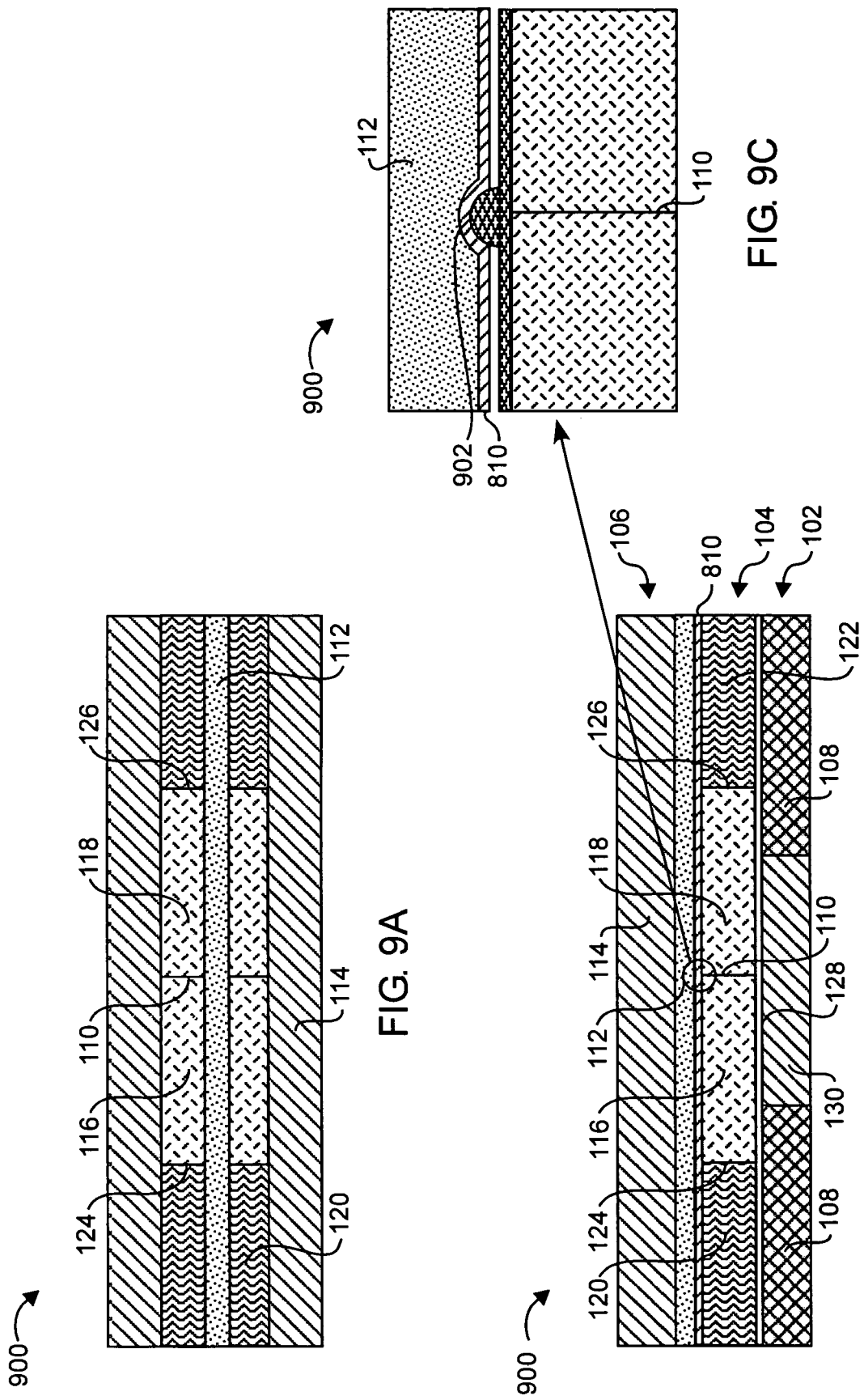

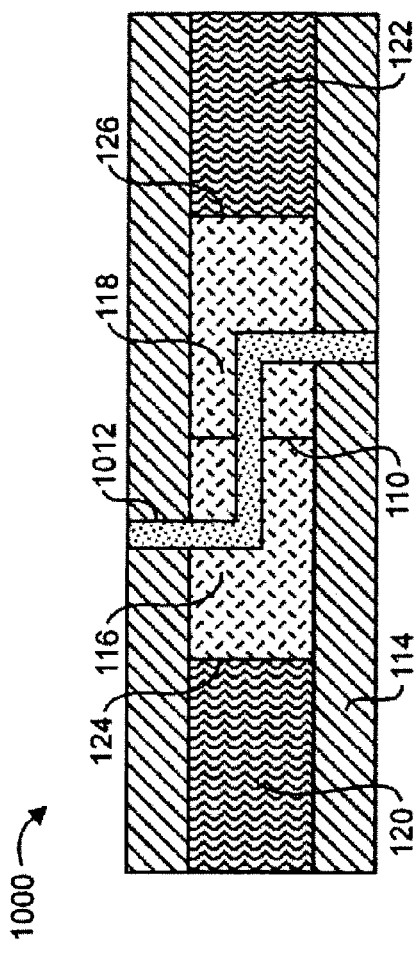
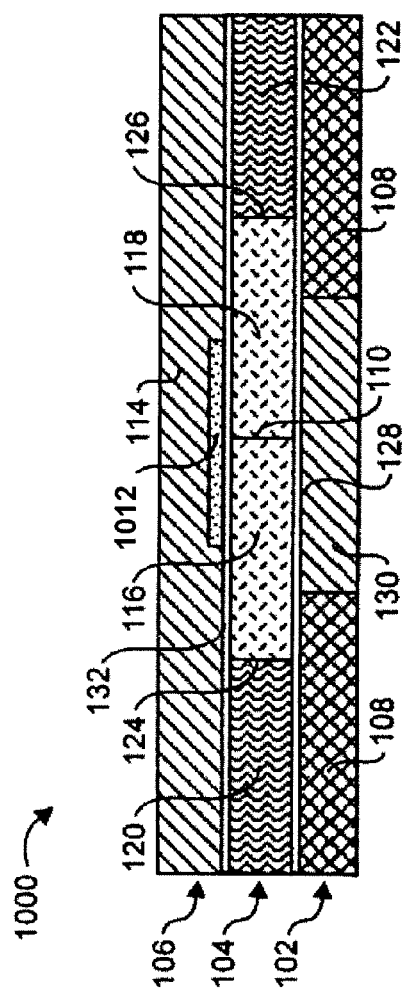

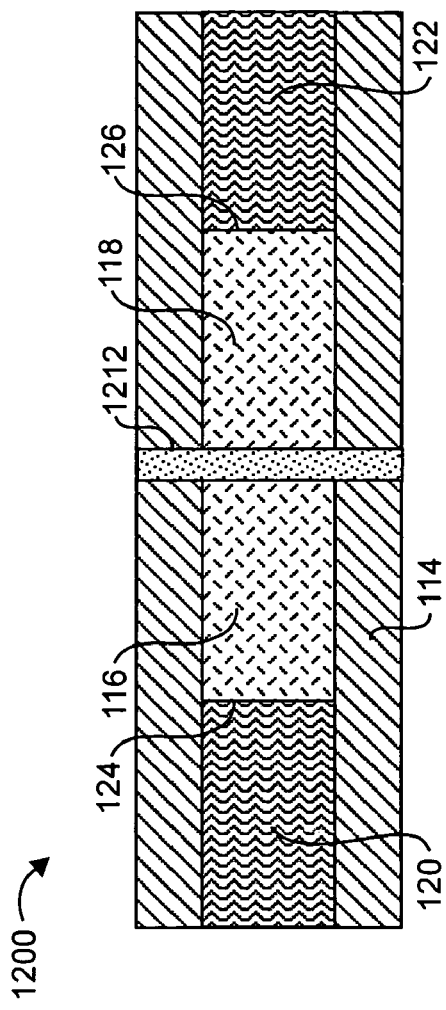
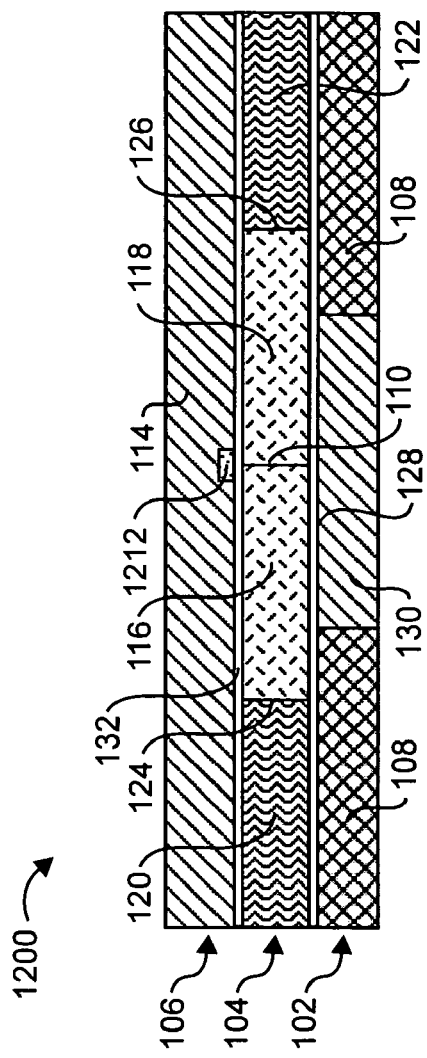
FIG. 12A
FIG. 12B

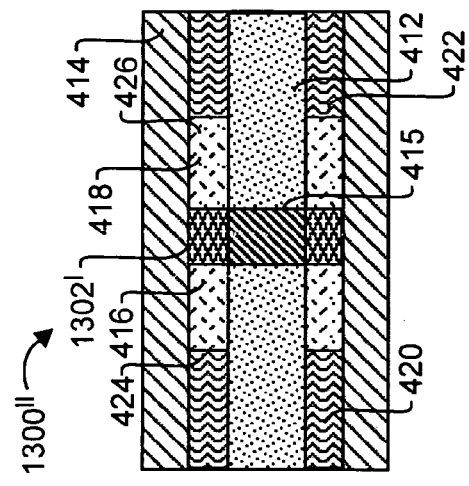
FIG. 13A
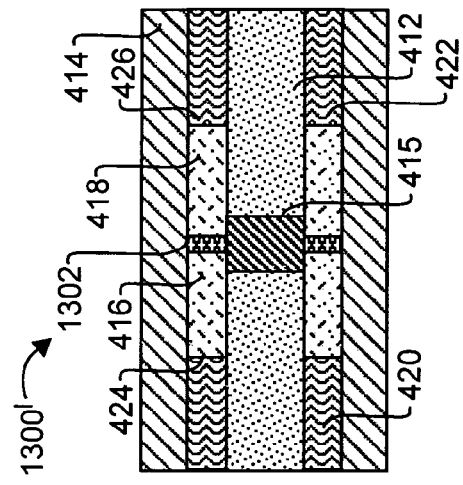
FIG. 13C
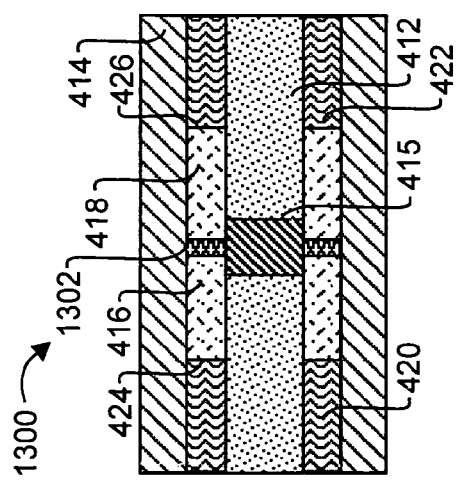
FIG. 13E
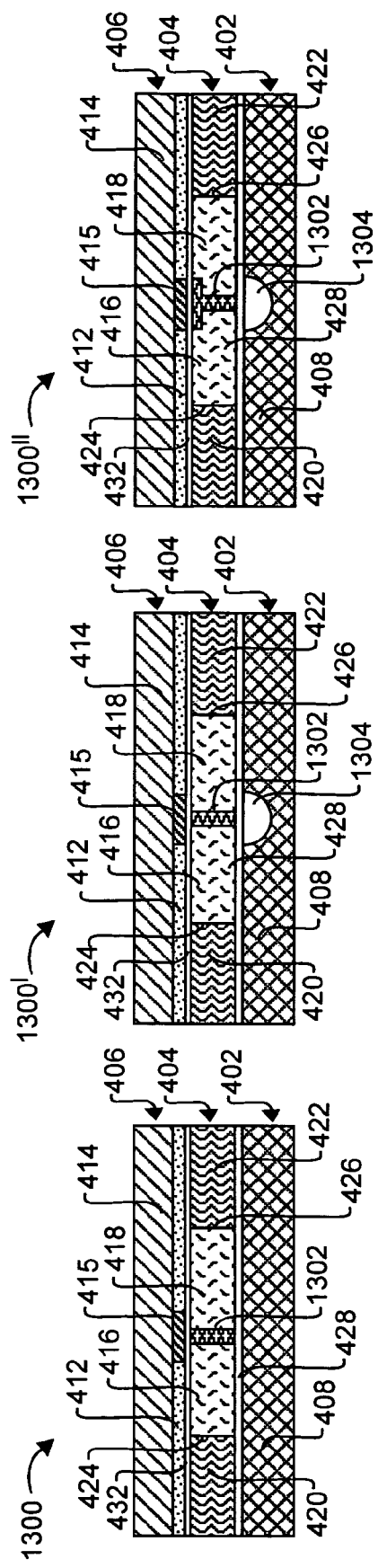
FIG. 13B
FIG. 13D
FIG. 13F

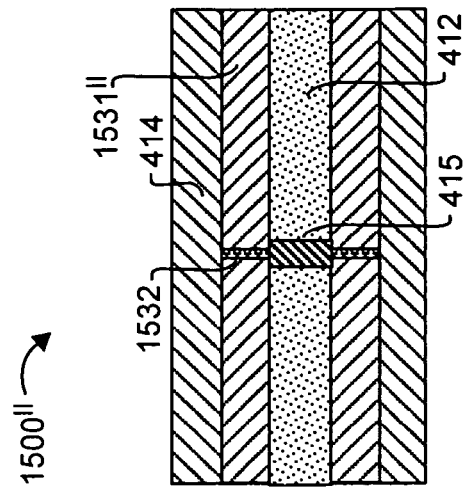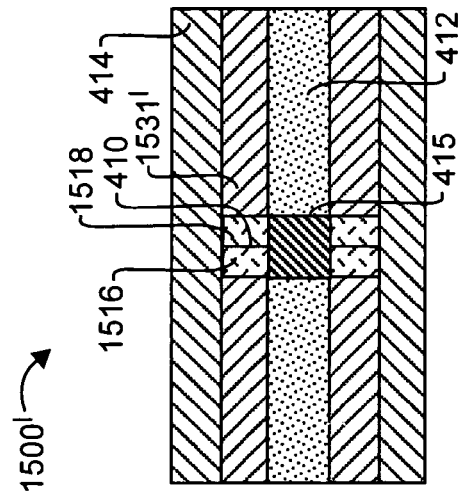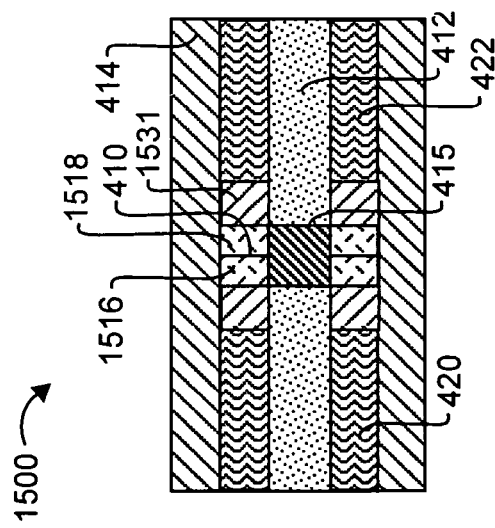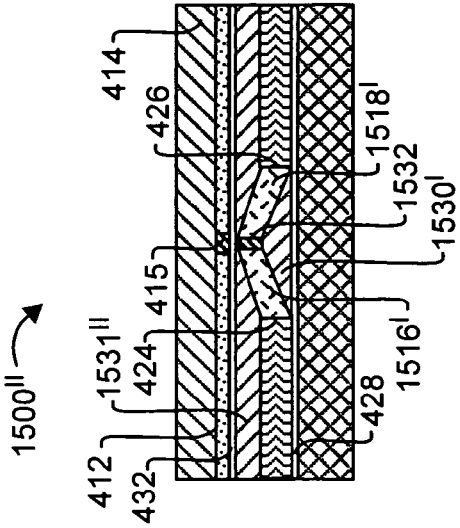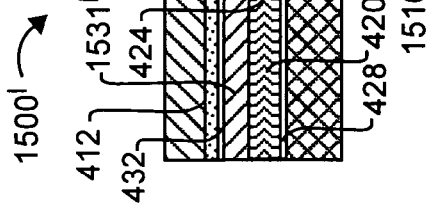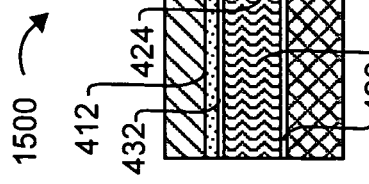

US 7,721,762 B2

FAST ACTING VALVE APPARATUSES

CROSS-REFERENCE TO RELATED APPLICATIONS

This application is a continuation-in-part of U.S. patent application Ser. No. 10/877,691 entitled "Microfluidic Devices With Separable Actuation and Fluid-Bearing Modules" filed on Jun. 24, 2004, which is incorporated herein by reference in its entirety, and a continuation-in-part of U.S. patent application Ser. No. 10/877,602 entitled "Microfluidic Valve Apparatuses With Separable Actuation and Fluid-Bearing Modules" filed on Jun. 24, 2004, which is incorporated herein by reference in its entirety.

TECHNICAL FIELD

The invention relates generally to devices and valves for controlling fluid or gas flow and, in particular, to fast acting devices and valves.

BACKGROUND ART

Traditional fluid valves operate by moving solid objects to obstruct the flow path. This typically requires sealing against a valve seat and leads to complicated geometries. While valves can be very reliable on the macroscopic scale, on the Micro Electro-Mechanical Systems (MEMS) scale, a number of issues can arise, including producing a valve seat that will seal with acceptably low leak rates, and dealing with contamination and small actuation forces. Moreover, such valves may have complicated geometries with large dead volumes.

BRIEF DESCRIPTION OF THE DRAWINGS

FIG. 5A is a top view of an example embodiment of a valve apparatus with a conduction layer including multiple linear thermoelectric junctions;

FIG. 5B is a cross-sectional view of the valve apparatus of FIG. 5A;

FIG. 6A is a top view of an example embodiment of a valve apparatus with a conduction layer including linear thermoelectric junctions that vary in length;

FIG. 6B is a cross-sectional view of the valve apparatus of FIG. 6A;

FIG. 7A is a top view of an example embodiment of a valve apparatus with a conduction layer including a thin film;

FIG. 7B is a cross-sectional view of the valve apparatus of FIG. 7A;

FIG. 7C is a cross-sectional view of an embodiment of a valve apparatus with a conduction layer including a thin film, and a heat-sink layer including a thermally insulating portion facing the linear thermoelectric junction;

FIG. 7D is a cross-sectional view of another embodiment of a valve apparatus with a conduction layer including a thin film, and a heat-sink layer including a thermally insulating portion facing the linear thermoelectric junction;

FIG. 9A is a top view of an example embodiment of a valve apparatus with a thermally conductive protrusion formed over the linear thermoelectric junction;

FIG. 9B is a cross-sectional view of the valve apparatus of FIG. 9A;

FIG. 9C is an enlarged view of the thermally conductive protrusion formed over the linear thermoelectric junction of FIG. 9B;

FIG. 10A is a top view of an example embodiment of a valve apparatus with a flow channel that is formed in the fluid-bearing layer to substantially avoid thermal coupling with the two hot Peltier junctions in the conduction layer;

FIG. 10B is a cross-sectional view of the valve apparatus of FIG. 1A;

FIG. 12A is a top view of an example embodiment of a valve apparatus with a flow channel that is symmetrically positioned in relation to the linear thermoelectric junction in its conduction layer;

FIG. 12B is a cross-sectional view of the valve apparatus of FIG. 12A;

FIG. 13A is a top view of an example embodiment of a valve apparatus with a conduction layer that includes a high conductivity metal sandwiched between n-type and p-type thermoelectric materials;

FIG. 13B is a cross-sectional view of the valve apparatus of FIG. 13A;

FIG. 13C is a top view of an example embodiment of a valve apparatus with a conduction layer that includes a high conductivity metal sandwiched between n-type and p-type thermoelectric materials, and a heat-sink layer that includes a thermally insulating portion facing the linear thermoelectric junction;

FIG. 13D is a cross-sectional view of the valve apparatus of FIG. 13C;

FIG. 13E is a top view of an example embodiment of a valve apparatus with a conduction layer that includes a high conductivity metal sandwiched between n-type and p-type thermoelectric materials, with the high conductivity metal being is wider at an edge of the conduction layer facing the fluid-bearing layer, and a heat-sink layer that includes a thermally insulating portion facing the linear thermoelectric junction;

FIG. 13F is a cross-sectional view of the valve apparatus of FIG. 13E;

FIG. 15A is a top view of an example embodiment of a valve apparatus with a conduction layer that includes a thermally insulating portion, which separates the two hot Peltier junctions of the conduction layer from the fluid-bearing layer;

FIG. 15B is a cross-sectional view of the valve apparatus of FIG. 15A;

FIG. 15C is a top view of an example embodiment of a valve apparatus with a conduction layer that includes a thermally insulating portion which separates the two hot Peltier junction of the conduction layer from the fluid-bearing layer and extends along the conduction layer past the hot Peltier junctions;

FIG. 15D is a cross-sectional view of the valve apparatus of FIG. 15C;

FIG. 15E is a top view of an example embodiment of a valve apparatus with a conduction layer that includes a thermally insulating portion which separates the two hot Peltier junction of the conduction layer from the fluid-bearing layer and extends along the conduction layer past the hot Peltier junctions, the conduction layer also including a high conductivity metal insert at the cold Peltier junction;

FIG. 15F is a cross-sectional view of the valve apparatus of FIG. 15E;

DISCLOSURE OF INVENTION

For purposes of this description, a "microfluidic" device or valve has one or more channels with at least one dimension less than 1 mm.

Figures 1A, 1B:
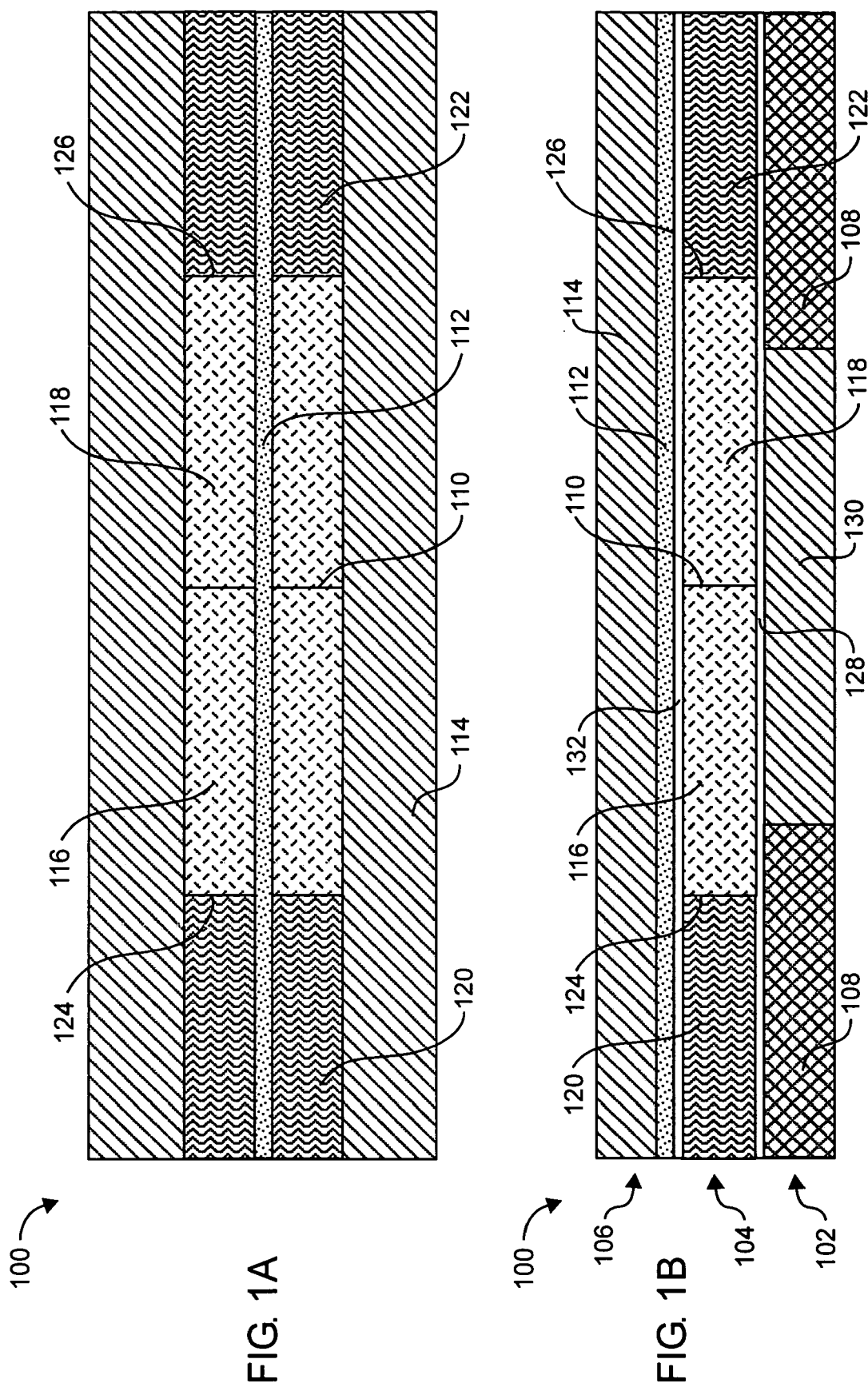
FIG. 1A is a top view of an example embodiment of a valve apparatus with a linear thermoelectric junction adjacent to a flow channel.
FIG. 1B is a cross-sectional side view of the valve apparatus of FIG. 1A.

Referring to FIGS. 1A and 1B, in an example embodiment, a valve apparatus 100 includes a heat-sink layer 102, a conduction layer 104, and a fluid-bearing layer 106. The heat-sink layer 102 includes thermally conductive material 108 such as copper, aluminum, or a ceramic. The conduction layer 104 is thermally coupled to the heat-sink layer 102 and includes a linear thermoelectric junction 110. The fluid-bearing layer 106 includes a flow channel 112 adjacent to and thermally coupled to the linear thermoelectric junction 110. In an example embodiment, the flow channel 112 has microfluidic dimensions and is formed in a substrate 114 made of a material such as polydimethylsiloxane (PDMS) with a low thermal conductivity.

In this example embodiment, the conduction layer 104 includes n-type thermoelectric material 116 and p-type thermoelectric material 118 which define the linear thermoelectric junction 110. The conduction layer 104 also includes a first electrical contact 120 adjacent to the n-type thermoelectric material 116, and a second electrical contact 122 adjacent to the p-type thermoelectric material 118. When an electrical current flows from the first electrical contact 120 through the n-type thermoelectric material 116 and the p-type thermoelectric material 118 to the second electrical contact 122, the thermoelectric (Peltier) effect will cause heat to be pumped from the junction between the n- and p-type materials to the two junctions 124, 126 between the thermoelectric materials and their respective electrical contacts. When in operation, there are thus one cold junction and two hot junctions. To make a valve, the flow channel 112 is fabricated crossing the cold junction. When power is applied, the fluid freezes at the cold junction blocking flow through the valve (provided the cold junction gets cold enough). The equilibrium temperature at the cold junction is controlled by the rate at which heat is removed, and the rate at which heat flows back to the junction due to thermal conduction. There are two sources for heat leaking back into the system. The first is thermal conduction from the environment around the valve, including the hot junctions. The second is from heat generated due to resistive heating. This occurs both throughout the bulk of the thermoelectric materials due to intrinsic resistivity of the materials, and at the interfaces due to contact resistance.

The electrical contacts 120, 122 are made of a material with a relatively high thermal conductivity (silver or copper, for example) to facilitate the conduction out of the system of heat released at the hot junctions. If the heat-sink layer 102 is electrically conducting, then the conduction layer 104 must be separated from the heat-sink layer 102 by a layer of an electrically insulating material to prevent shorting of the thermoelectric (TE) junction. In this example embodiment, the valve apparatus 100 includes a thin layer 128 of electrically insulating and thermally conductive material (e.g., glass) between the heat-sink layer 102 and the linear thermoelectric junction 110, which provides good thermal contact between the electrical contact materials 120, 122 and the heat-sink layer 102. In an example embodiment, the heat-sink layer 102 is large compared to the valve junction.

In this example embodiment, the heat-sink layer 102 includes a thermally insulating portion 130 (e.g., plastic) facing the linear thermoelectric junction 110. The thermally insulating portion 130 serves to thermally isolate the cold junction from the heat-sink layer to prevent heat from leaking back into the cold junction.

In this example embodiment, the valve apparatus 100 includes a thermally conductive barrier layer 132 (e.g., a thin layer of glass) between the flow channel 112 and the linear thermoelectric junction 110. The thermally conductive barrier layer 132 serves to protect the Peltier material used to form the junction from exposure to the fluid (either because the junction material might be degraded or because the fluid might be contaminated). To ensure good thermal conductivity between the fluid and the junction, the barrier layer should be kept thin (less than 5 microns, for example).

In an example embodiment, the n-type thermoelectric material 116 and p-type thermoelectric material 118 are fabricated from bismuth telluride, with each of the n and p legs having a length of 300 microns. For purposes of this description, the term "junction length" refers to the length of one of the n or p legs. Employing this definition, in the above example, the junction length is 300 microns.

In fabricating the valve apparatus 100, for example, the components include 5-mm-square n-type and p-type bismuth telluride elements, 300 microns thick, and 5-mm-square by 1-mm-thick blocks of electrical connectors (e.g., silver or copper). A sandwich structure including the electrical connectors and the n-type and p-type bismuth telluride elements is assembled, soldered together, and then diced, using either a jewelers saw or electric discharge machining (EDM) to produce 1-mm-square by 2.6-mm-long structures each incorporating a single linear TE junction along with thermal and electrical contact points for the hot-side junctions.

The valve apparatus 100 operates by forming a solid plug of the working fluid (e.g., ice) in a flow channel 112. The valve apparatus 100 is actuated by running an electric current through a Peltier junction adjacent to the fluid flow path, cooling the fluid sufficiently to freeze the fluid. The valve is opened by turning off the current, allowing the fluid to warm by conduction, or by reversing the current in the Peltier junction to heat the fluid. A valve operating on this principle has no moving parts and can have a straight, smooth-walled flow path. It is able to withstand differential pressures in excess of 2 MPa across the valve, has essentially zero leakage, and is unaffected by particulate contamination.

The rate at which heat is pumped from the cold junction to the hot junctions is linearly proportional to the electrical current density through the junctions. The rate of resistive heating is proportional to the square of the electric current density. As such, there will be an optimum current density beyond which the valve will tend to overheat. For an ideal case with a linear junction, infinite heat sinking at the hot side, and no heat leaking into the system from the environment, theoretical analyses indicate that the ideal current density is proportional to the Peltier coefficient and inversely proportional to the resistivity of the material and the length of the junction. In practice, the ideal case approximations become weaker as the overall dimensions of the device get smaller. For the Peltier-actuated microvalve, the junction temperature will be significantly affected by the heat load of the fluid in the flow channel and other environmental heat sources. In addition, the ideal case solution is for a steady-state condition. The performance of the valve with numerical thermal models is now described.

Figure 2A:
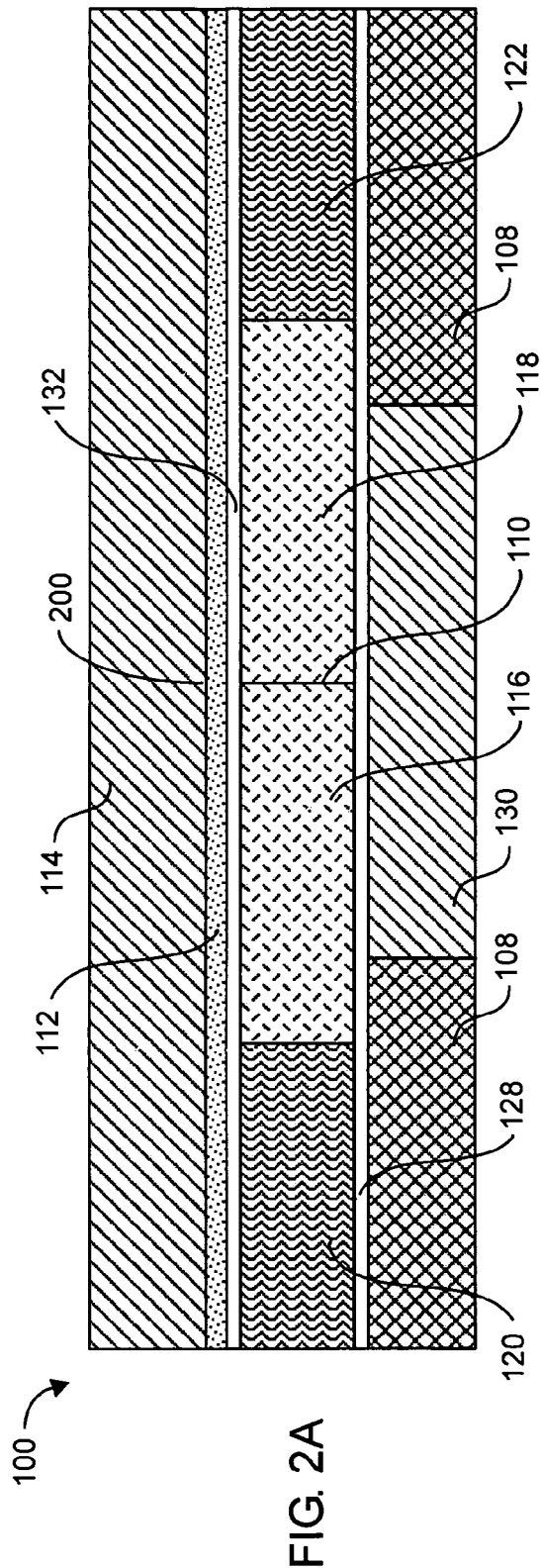
FIG. 2A is a cross-sectional side view of a valve apparatus as in FIG. 1B identifying a reference location.
Figure 2B:
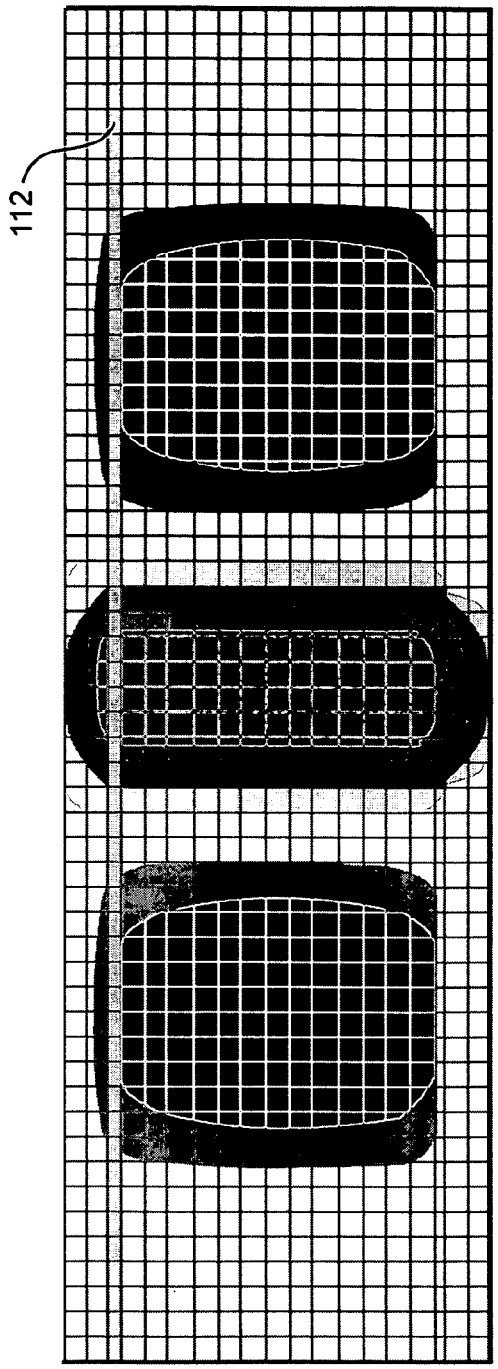
FIG. 2B illustrates a modeling of temperatures at the Peltier cold junction (linear thermoelectric junction) and at the two Peltier hot junctions of the valve apparatus of FIG. 2A during operation.

The temperature of the entire valve can be modeled, including the fluid in the flow channel, as a function of time in response to step changes in current flowing through the valve. The valve closing time can be estimated by monitoring the temperature of the point on the wall of the flow channel directly opposite the cold junction, reference location 200 (FIG. 2). When this temperature falls below the freezing point of the fluid, then the valve will be closed.

Figure 3A:
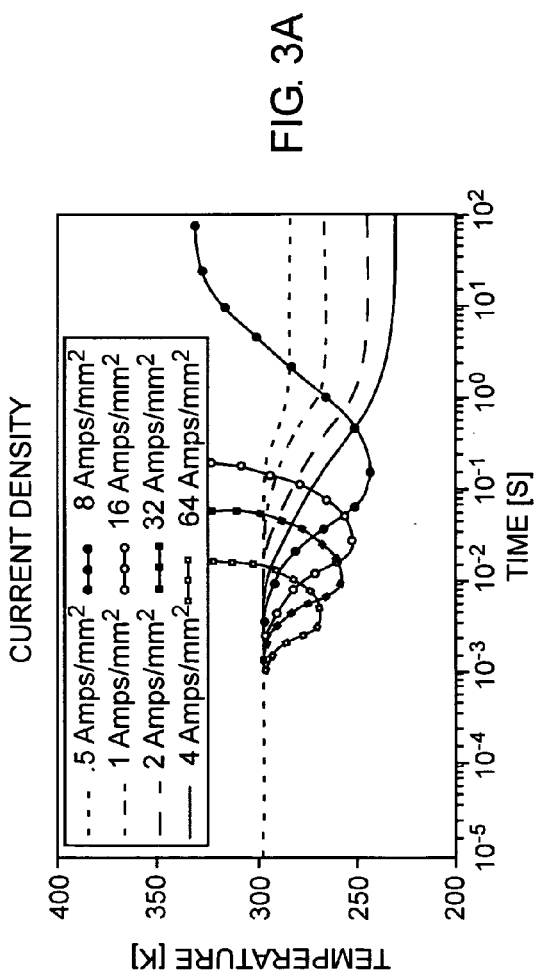
FIG. 3A is a plot showing modeling results for a Peltier cold junction temperature for different current densities over time.

FIG. 3A shows the temperature of the reference location 200 for a valve with a junction length (single leg) of 1.5 mm, and a depth of 1 mm. The different traces indicate the temperature as a function of time when the current is switched from an initial value of zero in a step function at time equal zero to various current densities. At current densities below 1 A/mm$^2$, the valve never gets cold enough to freeze water. At 4 A/mm$^2$, the valve cools to the freezing point of water in about 100 ms. At 8 A/mm$^2$, the valve freezes in about 50 ms, but after about 1 second, it overheats and melts. As the current density is increased, the whole process is faster, and the valve briefly closes up to a current density of at least 32 A/mm$^2$. When the current density is 64 A/mm$^2$, the valve does not cool enough to freeze the fluid before it begins to overheat. In an example embodiment, the valve is operated at a current density below 8 A/mm$^2$, if it is intended to stay closed, and its fastest closing time will be slightly less than 100 ms.

Figure 3B:
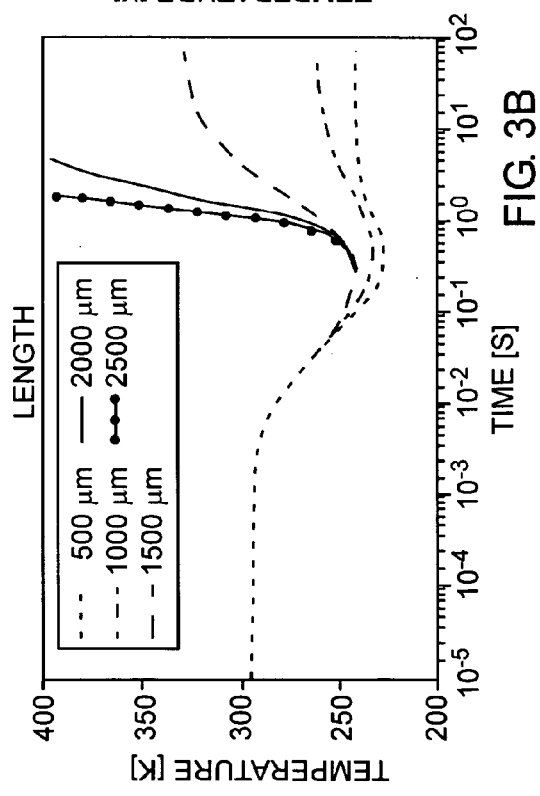
FIG. 3B is a plot showing modeling results for a Peltier cold junction temperature for different junction lengths over time.
Figure 3C:
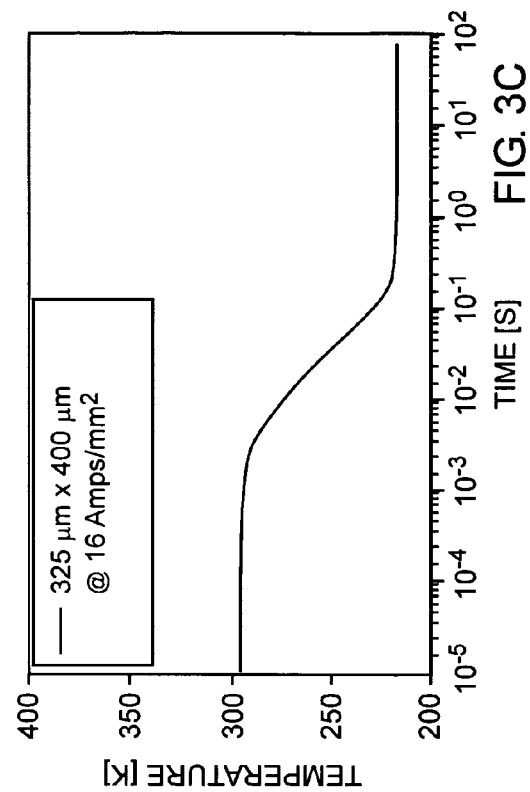
FIG. 3C is a plot showing modeling results for a Peltier cold junction temperature for a junction with a junction length of 400 microns and a depth of 325 microns.

The tendency to overheat can be controlled by decreasing the length of the valve junction. This is illustrated in FIG. 3B, where the temperature of the reference point 200 is plotted for various valves with a constant current density of 8 A/mm$^2$. In this case, the various traces show the temperature as a function of time after the current is turned on for various valve junction lengths. In each case, the valve initially cools enough to freeze the fluid in about 50 ms. For valves with junctions 1.5 mm or longer, the valve will eventually overheat, with the longer junctions overheating more quickly. For very short junctions, this current density is not sufficient to overheat the valve. Combining the trends indicated in FIGS. 3A and 3B, a result is that a fast valve can be made with a very short junction length and a very high current density. FIG. 3C shows the temperature as a function of time for a valve with a junction length of 400 microns, a depth of 325 microns, and a current density of 16 A/mm$^2$. The model indicates that this valve should close in about 10 ms.

In an example embodiment, the length of the linear thermoelectric junction 110 is less than 1.5 mm. In another example embodiment, the length of the linear thermoelectric junction 110 is less than 0.5 mm. In another example embodiment, the conduction layer, when electrically connected to a power source (not shown), permits a current density of at least 16 A/mm$^2$ at the linear thermoelectric junction.

Figure 4C:
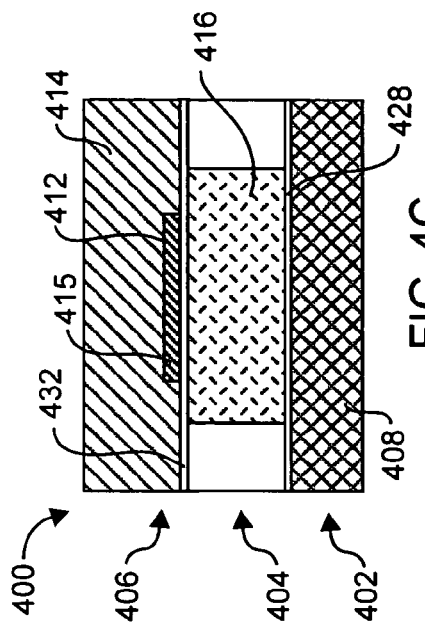
FIGS. 4B and 4C are cross-sectional front and right side views respectively of the valve apparatus of FIG. 4A.
Figure 4A:
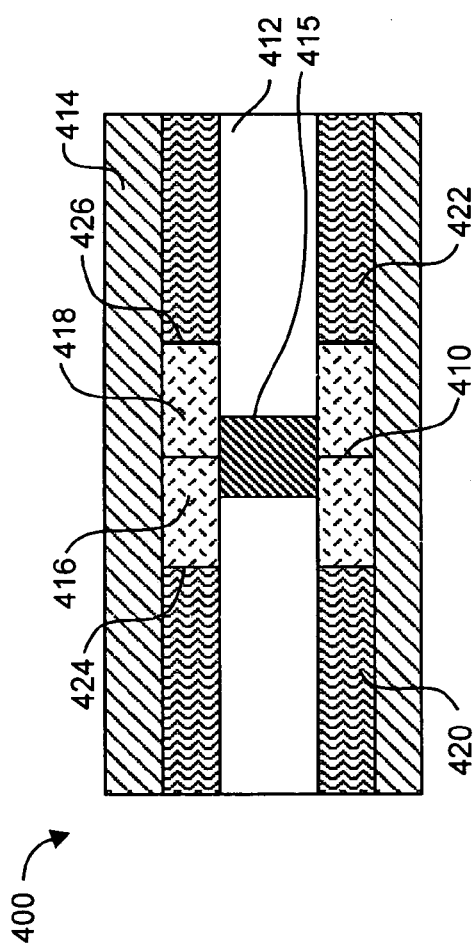
FIG. 4A is a top view of an example embodiment of a valve apparatus with a flow channel that has a high aspect ratio, showing an ice plug in the flow channel over the linear thermoelectric junction.
Figure 4B:
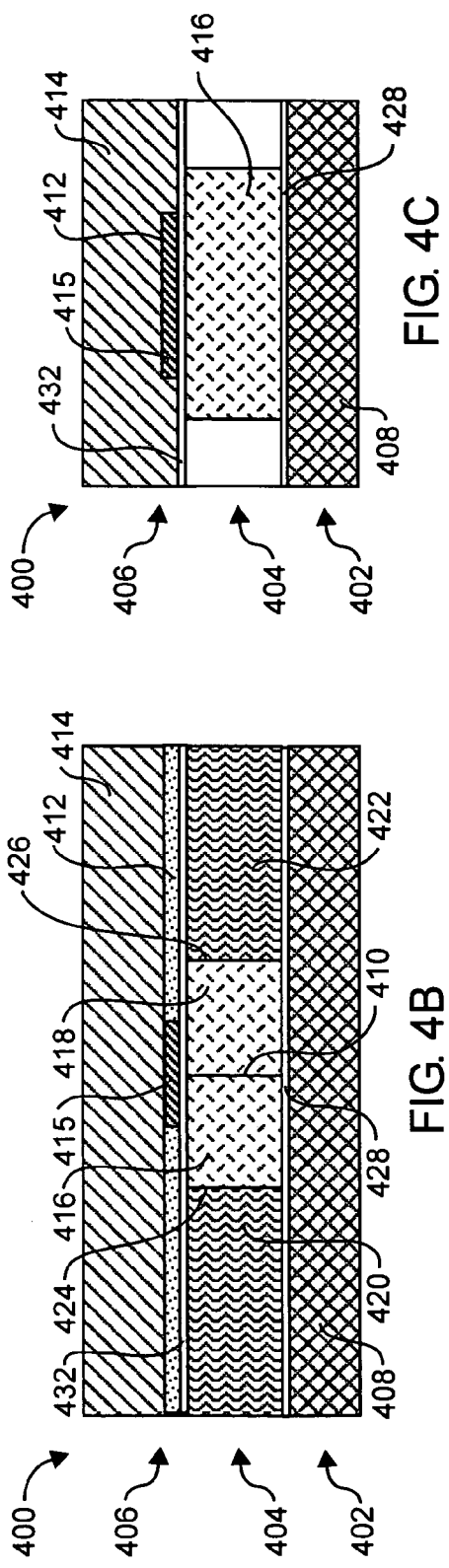

FIGS. 4A and 4B show an example embodiment of a valve apparatus 400 with a flow channel that provides a large surface-to-volume ratio, increasing the heat transfer to the fluid, thereby decreasing the reaction time. In this example embodiment, the valve apparatus 400 includes a heat-sink layer 402, a conduction layer 404, and a fluid-bearing layer 406. The heat-sink layer 402 includes thermally conductive material 408 such as copper, aluminum, or a ceramic. The conduction layer 404 is thermally coupled to the heat-sink layer 402 and includes a linear thermoelectric junction 410. The fluid-bearing layer 406 includes a flow channel 412 adjacent to and thermally coupled to the linear thermoelectric junction 410. In an example embodiment, the flow channel 412 has microfluidic dimensions and is formed in a substrate 414 made of a material such as polydimethylsiloxane (PDMS) with a low thermal conductivity. In this example embodiment, the flow channel 412 has a high aspect ratio, as is illustrated (best in FIG. 4C) by the ice plug 415 in the flow channel 412 over the linear thermoelectric junction 410. The term "aspect ratio" refers to the ratio of width to depth of the flow channel 412. By way of example, the flow channel 412 is 500 microns in width and 50 microns in depth, providing a 10:1 aspect ratio.

In this example embodiment, the conduction layer 404 includes n-type thermoelectric material 416 and p-type thermoelectric material 418 (e.g., both fabricated from bismuth telluride) which define the linear thermoelectric junction 410. The conduction layer 404 also includes a first electrical contact 420 adjacent to the n-type thermoelectric material 416, and a second electrical contact 422 adjacent to the p-type thermoelectric material 418. When an electrical current flows from the first electrical contact 420 through the n-type thermoelectric material 416 and the p-type thermoelectric material 418 to the second electrical contact 422, the thermoelectric (Peltier) effect will cause heat to be pumped from the junction between the n- and p-type materials to the two junctions 424, 426 between the thermoelectric materials and their respective electrical contacts. When in operation, there are thus one cold junction and two hot junctions. To make a valve, the flow channel 412 is fabricated crossing the cold junction. When power is applied, the fluid freezes at the cold junction blocking flow through the valve (provided the cold junction gets cold enough). The equilibrium temperature at the cold junction is controlled by the rate at which heat is removed, and the rate at which heat flows back to the junction due to thermal conduction. There are two sources for heat leaking back into the system. The first is thermal conduction from the environment around the valve, including the hot junctions. The second is from heat generated due to resistive heating. This occurs both throughout the bulk of the thermoelectric materials due to intrinsic resistivity of the materials, and at the interfaces due to contact resistance.

The electrical contacts 420, 422 are made of a material with a relatively high thermal conductivity (silver or copper, for example) to facilitate the conduction out of the system of heat released at the hot junctions. If the heat-sink layer 402 is electrically conducting, then the conduction layer 404 must be separated from the heat-sink layer 402 by a layer of an electrically insulating material to prevent shorting of the thermoelectric (TE) junction. In this example embodiment, the valve apparatus 400 includes a thin layer 428 of electrically insulating and thermally conductive material (e.g., glass) between the heat-sink layer 402 and the linear thermoelectric junction 410, which provides good thermal contact between the electrical contact materials 420, 422 and the heat-sink layer 402. In an example embodiment, the heat-sink layer 102 is large compared to the valve junction.

In this example embodiment, the valve apparatus 400 includes a thermally conductive barrier layer 432 (e.g., a thin layer of glass) between the flow channel 412 and the linear thermoelectric junction 410. The thermally conductive barrier layer 432 serves to protect the Peltier material used to form the junction from exposure to the fluid (either because the junction material might be degraded or because the fluid might be contaminated). To ensure good thermal conductivity between the fluid and the junction, the barrier layer should be kept thin (less than 5 microns, for example).

In an example embodiment, the valve apparatus 400 has a short junction and a high current density. Because the valve will not be closed until the ice plug has grown across the entire thickness (depth) of the flow channel 412, that thickness will also influence the closing time of the valve. To keep the valve fast, the thickness should be kept as small as practical. Within this constraint, the total flow capacity of the valve can be increased by giving the flow channel 412 a large aspect ratio.

FIGS. 5A and 5B show an example embodiment of a valve apparatus 500 with a conduction layer including multiple linear thermoelectric junctions. In this example embodiment, each linear thermoelectric junction has one exposed face embedded in a planar substrate. In this example embodiment, multiple valves are combined in a device by fabricating multiple linear junctions in a single planar substrate with all junctions having one face exposed in the plane, and flow channels are also fabricated in a single plane.

In this example embodiment, the valve apparatus 500 includes a heat-sink layer 502, a conduction layer 504, and a fluid-bearing layer 506. The heat-sink layer 502 includes thermally conductive material 508 such as copper, aluminum, or a ceramic. The conduction layer 504 is thermally coupled to the heat-sink layer 502 and includes linear thermoelectric junctions 510. The fluid-bearing layer 506 includes a flow channel 512 adjacent to and thermally coupled to the linear thermoelectric junctions 510. In an example embodiment, the flow channel 512 has microfluidic dimensions and is formed in a substrate 514 made of a material such as polydimethylsiloxane (PDMS) with a low thermal conductivity.

In this example embodiment, the conduction layer 504 includes n-type thermoelectric materials 516 and p-type thermoelectric materials 518 (e.g., both fabricated from bismuth telluride) which define the linear thermoelectric junctions 510. The conduction layer 504 also includes first electrical contacts 520 adjacent to the n-type thermoelectric materials 516, and second electrical contact 522 adjacent to the p-type thermoelectric materials 518. For each of the valves, when an electrical current flows from the first electrical contact 520 through the n-type thermoelectric material 516 and the p-type thermoelectric material 518 to the second electrical contact 522, the thermoelectric (Peltier) effect will cause heat to be pumped from the junction between the n- and p-type materials to the two junctions 524, 526 between the thermoelectric materials and their respective electrical contacts. When in operation, there are thus one cold junction and two hot junctions for each valve. To make the valves, the flow channels 512 are fabricated crossing the cold junctions. When power is applied (e.g., to select valves to define one or more fluidic paths through the device), the fluid freezes at the cold junction(s) blocking flow through the corresponding valve(s) (provided the cold junction(s) gets cold enough).

The electrical contacts 520, 522 are made of a material with a relatively high thermal conductivity (silver or copper, for example) to facilitate the conduction out of the system of heat released at the hot junctions. If the heat-sink layer 502 is electrically conducting, then the conduction layer 504 must be separated from the heat-sink layer 502 by a layer of an electrically insulating material to prevent shorting of the thermoelectric (TE) junction. In this example embodiment, the valve apparatus 500 includes a thin layer 528 of electrically insulating and thermally conductive material (e.g., glass) between the heat-sink layer 502 and the linear thermoelectric junctions 510, which provides good thermal contact between the electrical contact materials 520, 522 and the heat-sink layer 502. In an example embodiment, the heat-sink layer 502 is large compared to the valve junction.

In this example embodiment, the heat-sink layer 502 includes thermally insulating portions 530 (e.g., plastic) facing the linear thermoelectric junctions 510. The thermally insulating portions 530 serve to thermally isolate the cold junctions from the heat-sink layer to prevent heat from leaking back into the cold junction.

In this example embodiment, the conduction layer 504 includes low thermal conductivity portions 531 (e.g., plastic or fiberglass) between the valves as shown.

In this example embodiment, the valve apparatus 500 includes a thermally conductive barrier layer 532 (e.g., a thin layer of glass) between the flow channel 512 and the linear thermoelectric junctions 510. The thermally conductive barrier layer 532 serves to protect the Peltier material used to form the junction from exposure to the fluid (either because the junction material might be degraded or because the fluid might be contaminated). To ensure good thermal conductivity between the fluid and the junction, the barrier layer should be kept thin (less than 5 microns, for example).

In an example embodiment, a valve apparatus includes a heat-sink layer including a thermally conductive material, a conduction layer thermally coupled to the heat-sink layer, the conduction layer including linear thermoelectric junctions, and a fluid-bearing layer including flow channels adjacent to and thermally coupled to the linear thermoelectric junctions, the flow channel having microfluidic dimensions. In an example embodiment, the conduction layer is formed as a single substrate with the linear thermoelectric junctions being exposed at a planar surface of the conduction layer, which faces the fluid-bearing layer.

FIGS. 6A and 6B show an example embodiment of a valve apparatus 600 with a conduction layer including linear thermoelectric junctions that vary in length. By way of example, fabricating multiple junctions (e.g., in a single plane) makes it possible to overcome one of the drawbacks of using very short junctions, which is the high current density required to keep them closed. As described herein, multiple valves can also be used in series to increase the pressure capability of the valve apparatus.

In this example embodiment, the valve apparatus 600 includes a heat-sink layer 602, a conduction layer 604, and a fluid-bearing layer 606. The heat-sink layer 602 includes thermally conductive material 608 such as copper, aluminum, or a ceramic. The conduction layer 604 is thermally coupled to the heat-sink layer 602 and includes linear thermoelectric junctions 610, 611. The fluid-bearing layer 606 includes a flow channel 612 adjacent to and thermally coupled to the linear thermoelectric junctions 610, 611. In an example embodiment, the flow channel 612 has microfluidic dimensions and is formed in a substrate 614 made of a material such as polydimethylsiloxane (PDMS) with a low thermal conductivity.

In this example embodiment, the conduction layer 604 includes n-type thermoelectric materials 616, 617 and p-type thermoelectric materials 618, 619 (e.g., fabricated from bismuth telluride) which define the linear thermoelectric junctions 610, 611 as shown. The conduction layer 604 also includes first electrical contacts 620 adjacent to the n-type thermoelectric materials 616, 617 and second electrical contact 622 adjacent to the p-type thermoelectric materials 618, 619. For the slow valve, when an electrical current flows from the first electrical contact 620 through the n-type thermoelectric material 616 and the p-type thermoelectric material 618 to the second electrical contact 622, the thermoelectric (Peltier) effect will cause heat to be pumped from the junction between the n- and p-type materials to the two junctions 624, 626 between the thermoelectric materials and their respective electrical contacts. For the fast valve, when an electrical current flows from the first electrical contact 620 through the n-type thermoelectric material 617 and the p-type thermoelectric material 619 to the second electrical contact 622, the thermoelectric (Peltier) effect will cause heat to be pumped from the junction between the n- and p-type materials to the two junctions 625, 627 between the thermoelectric materials and their respective electrical contacts. When in operation, there are thus one cold junction and two hot junctions for each valve. To make the valves, the flow channel 612 is fabricated crossing the cold junctions. When power is applied (e.g., selectively to the slow and fast valves), the fluid freezes at the cold junction(s) blocking flow through the corresponding valve(s) (provided the cold junction(s) gets cold enough).

The electrical contacts 620, 622 are made of a material with a relatively high thermal conductivity (silver or copper, for example) to facilitate the conduction out of the system of heat released at the hot junctions. If the heat-sink layer 602 is electrically conducting, then the conduction layer 604 must be separated from the heat-sink layer 602 by a layer of an electrically insulating material to prevent shorting of the thermoelectric (TE) junction. In this example embodiment, the valve apparatus 600 includes a thin layer 628 of electrically insulating and thermally conductive material (e.g., glass) between the heat-sink layer 602 and the linear thermoelectric junctions 610, 611, which provides good thermal contact between the electrical contact materials 620, 622 and the heat-sink layer 602. In an example embodiment, the heat-sink layer 602 is large compared to the valve junction.

In this example embodiment, the conduction layer 604 includes low thermal conductivity portions 631 (e.g., PDMS) between the valves as shown.

In this example embodiment, the valve apparatus 600 includes a thermally conductive barrier layer 632 (e.g., a thin layer of glass) between the flow channel 612 and the linear thermoelectric junctions 610, 611. The thermally conductive barrier layer 632 serves to protect the Peltier material used to form the junction from exposure to the fluid (either because the junction material might be degraded or because the fluid might be contaminated). To ensure good thermal conductivity between the fluid and the junction, the barrier layer should be kept thin (less than 5 microns, for example).

In an example embodiment, a valve apparatus combines a short junction with a long junction. Longer junctions can work at lower current densities, but take a longer time to close. In this example, a flow channel crosses both a short junction and a long junction to make a combined valve. For example, the short junction can be 300 microns in length, and require a current of 3 amperes to close. In operation, such a combined valve is closed rapidly by simultaneously applying power to both junctions. The short junction will close first, stopping flow in the channel. After a brief period, the longer junction will also freeze, at which time the power to the short junction can be switched off. It is also possible in this configuration to overdrive the short junction as illustrated in FIG. 3A. The overdrive will cause the short junction to freeze rapidly, but by the time it overheats and melts again, the longer junction will be closed.

In an example embodiment, a valve apparatus includes linear thermoelectric junctions that vary in length. In another example embodiment, a valve apparatus includes two linear thermoelectric junctions configured to provide a combined valve where one junction decreases in temperature more rapidly than the other. In another example embodiment, a valve apparatus includes two linear thermoelectric junctions configured to provide a combined valve where one junction experiences an overdrive condition while the other continues to decrease in temperature.

Another advantage of fabricating junctions in a plane, according to various embodiments of the present invention, is that the configuration lends itself well to planar fabrication techniques used for microelectronics. Instead of fabricating linear junctions and incorporating them in a device containing contact points and a heat sink, the entire device can be fabricated using traditional photolithographic techniques. By way of example, such a method can be used to produce thin films of both electrical conductors and Peltier junctions on a planar substrate that incorporates the heat sink.

FIGS. 7A and 7B show an example embodiment of a valve apparatus 700 with a conduction layer including a thin film. In this example embodiment, the valve apparatus 700 includes a heat-sink layer 702, a conduction layer 704, and a fluid-bearing layer 706. The heat-sink layer 702 includes thermally conductive material 708 such as copper, aluminum, or a ceramic. In this example embodiment, the conduction layer 704, a thin film, is thermally coupled to the heat-sink layer 702 and includes a linear thermoelectric junction 710. The fluid-bearing layer 706 includes a flow channel 712 adjacent to and thermally coupled to the linear thermoelectric junction 710. In an example embodiment, the flow channel 712 has microfluidic dimensions and is formed in a substrate 714 made of a material such as polydimethylsiloxane (PDMS) with a low thermal conductivity. An ice plug 715 is shown in the flow channel 712 over the linear thermoelectric junction 710.

In this example embodiment, the conduction layer 704 includes n-type thermoelectric material 716 and p-type thermoelectric material 718 (e.g., both fabricated from bismuth telluride) which define the linear thermoelectric junction 710. The conduction layer 704 also includes a first electrical contact 720 adjacent to the n-type thermoelectric material 716, and a second electrical contact 722 adjacent to the p-type thermoelectric material 718. When an electrical current flows from the first electrical contact 720 through the n-type thermoelectric material 716 and the p-type thermoelectric material 718 to the second electrical contact 722, the thermoelectric (Peltier) effect will cause heat to be pumped from the junction between the n- and p-type materials to the two junctions 724, 726 between the thermoelectric materials and their respective electrical contacts. When in operation, there are thus one cold junction and two hot junctions. To make a valve, the flow channel 712 is fabricated crossing the cold junction. When power is applied, the fluid freezes at the cold junction blocking flow through the valve (provided the cold junction gets cold enough).

The electrical contacts 720, 722 are made of a material with a relatively high thermal conductivity (silver or copper, for example) to facilitate the conduction out of the system of heat released at the hot junctions. If the heat-sink layer 702 is electrically conducting, then the conduction layer 704 must be separated from the heat-sink layer 702 by a layer of an electrically insulating material to prevent shorting of the thermoelectric (TE) junction. In this example embodiment, the valve apparatus 700 includes a thin layer 728 of electrically insulating and thermally conductive material (e.g., glass) between the heat-sink layer 702 and the linear thermoelectric junction 710, which provides good thermal contact between the electrical contact materials 720, 722 and the heat-sink layer 702. In an example embodiment, the heat-sink layer 702 is large compared to the valve junction.

In this example embodiment, the valve apparatus 700 includes a thermally conductive barrier layer 732 (e.g., a thin layer of glass) between the flow channel 712 and the linear thermoelectric junction 710. The thermally conductive barrier layer 732 serves to protect the Peltier material used to form the junction from exposure to the fluid (either because the junction material might be degraded or because the fluid might be contaminated). To ensure good thermal conductivity between the fluid and the junction; the barrier layer should be kept thin (less than 5 microns, for example).

FIG. 7C shows an example embodiment of a valve apparatus 700', which is the same as the valve apparatus 700 except as described below. In this example embodiment, Peltier junctions of approximately 50 microns thickness (depth) or greater are used to form a valve, and the cold side of the thin-film Peltier junction is isolated from the heat sink by a thermally insulating portion (or thermal isolation cell) 730. For example, a recess is fabricated as shown in the heat-sink layer 702 and filled with an insulating material. FIG. 7D shows another example embodiment of a valve apparatus 700", which is the same as the valve apparatus 700', except that it includes a thermally insulating portion (or thermal isolation cell) 730' recessed only partially through the heat-sink layer 702 as shown. In an example embodiment, a valve apparatus includes a thin film, and the heat-sink layer includes a thermally insulating portion facing the linear thermoelectric junction.

Another advantage of fabricating junctions in a plane, according to various embodiments of the present invention, is that the planar surface can become a line of separation. This makes it possible to incorporate the thermoelectrics as well as the control electronics in one module, and to put the flow channels in another module.

Figure 8A:
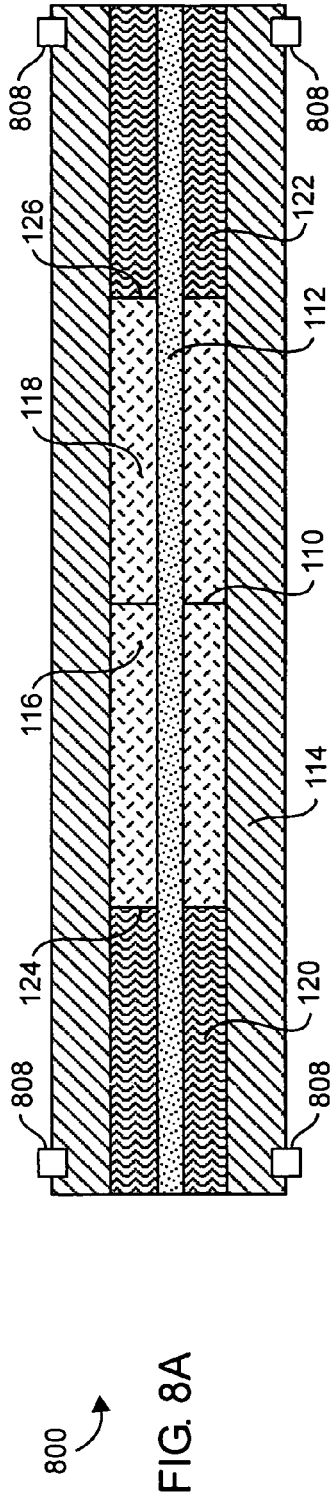
FIG. 8A is a top view of an example embodiment of a valve apparatus with a heat-sink layer and a conduction layer that are part of a control module including control electronics.
Figure 8B:
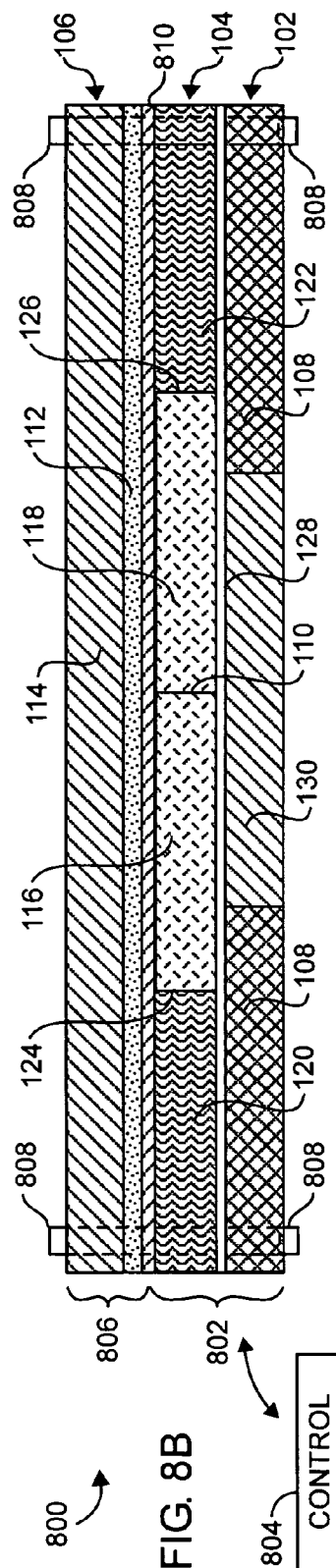
FIG. 8B is a cross-sectional view of the valve apparatus of FIG. 8A.

Referring to FIGS. 8A and 8B, an example embodiment of a valve apparatus 800 is the same as the valve apparatus 100 except as described below. In this example embodiment, the heat-sink layer 102 and the conduction layer 104 are part of a control module 802 that includes control electronics 804, and the fluid-bearing layer 106 is part of a fluid-bearing module 806 that is detachably secured to the control module 802 (e.g., by clamps 808) with an interface between the two modules being denoted by line of separation 810.

For use, the two modules are brought together such that the Peltier junctions in the control module 802 are in good thermal contact with the fluid channels in the fluid-bearing module 806. After each use, the fluid-bearing module 806 is removed from the control module 802 and may be cleaned or discarded. By this method, fluid samples from successive uses of the device are not subject to cross contamination.

In some cases, however, it may be necessary or desirable to provide better thermal contact between the junction and the fluid than would be possible with a line of separation between them. In such a case, according to another embodiment of the present invention, the line of separation is moved to a location between the Peltier junctions and the heat sink. In this case, the fluid module incorporates Peltier junctions and electrical and thermal contact points that would mate with the control module. The control module incorporates matching electrical and thermal contact points, as well as the control electronics. By this method, the fluid channels are always in good thermal contact with the Peltier junctions. At the same time, the majority of the expensive components are in the control module, and the fluid module can still be of relatively low cost so that it can be disposable.

Figure 8C:
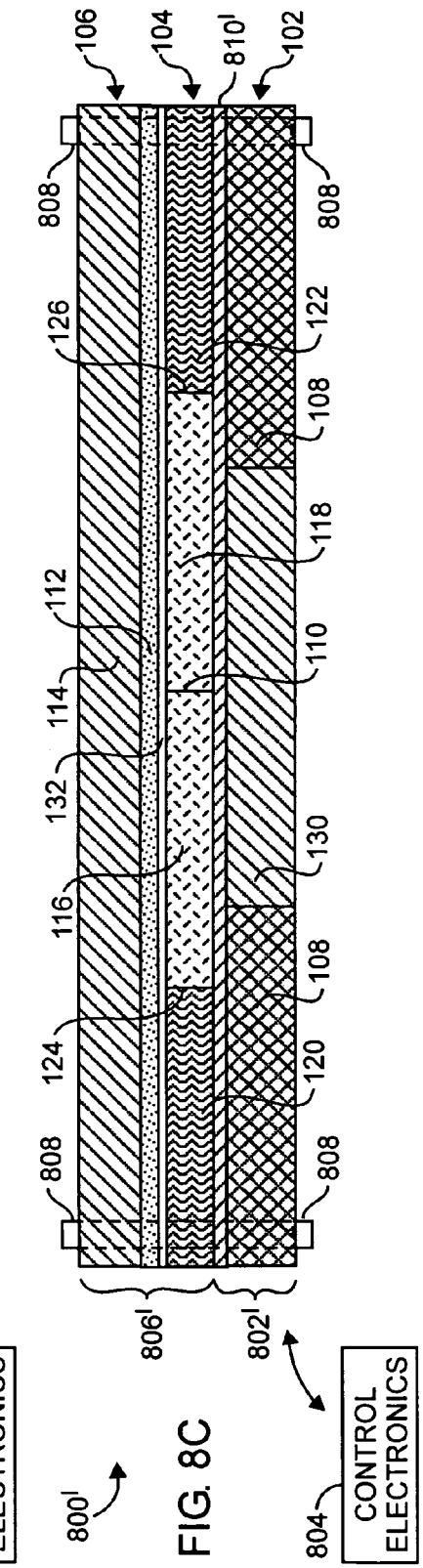
FIG. 8C is a cross-sectional view of an embodiment of a valve apparatus with a heat-sink layer that is part of a control module including control electronics.

Referring to FIG. 8C, an example embodiment of a valve apparatus 800' is the same as the valve apparatus 800 except as described below. In this example embodiment, the heat-sink layer 102 is part of a control module 802' that includes control electronics 804, and the fluid-bearing layer 106 and the conduction layer 104 are part of a fluid-bearing module 806' that is detachably secured to the control module 802' (e.g., by clamps 808) with an interface between the two modules being denoted by line of separation 810'. In such an embodiment, the thermoelectrics are permanently attached to the flow channel and a purely electrical interface can be provided at the line of separation 810'.

A primary issue with having the line of separation between the flow channels and the Peltier junctions is that particles of dust, or other contaminants, may prevent good thermal contact when the two modules are brought together. This problem can be avoided, according to an embodiment of the present invention, by fabricating a small protrusion over the cold junction.

Referring to FIGS. 9A-9C, an example embodiment of a valve apparatus 900 is the same as the valve apparatus 800 except as described below. In this example embodiment, the valve apparatus 900 includes a thermally conductive protrusion 902 formed over the linear thermoelectric junction 110 for ensuring good thermal contact between the control module and the thermal module (control electronics and clamps not shown). In an example embodiment, the protrusion 902 is 5 to 25 microns high and made of a material with a good thermal conductivity. One method for fabricating the protrusion takes advantage of the presence of the Peltier junction. Many coatings exist that are applied in liquid form (e.g., uniform spin coat) and then cured by heating. To fabricate protrusions, such a coating is applied to a planar or other surface containing one or more Peltier junctions. The Peltier junctions are then operated in reverse, creating a local hot spot at the location where a cold spot will eventually form a valve. The hot spot is maintained for a length of time sufficient to cause the coating to cure over a local region. The uncured coating is then removed by washing, leaving protrusions of cured coating over each of the Peltier junctions.

In the valves described so far, the flow channel crosses both the cold and hot Peltier junctions. Although good heat sinking will prevent the hot junctions from warming much beyond ambient temperatures, it may be preferable to avoid having the fluid come in contact with the hot junctions.

Referring to FIGS. 10A and 10B, an example embodiment of a valve apparatus 1000 is the same as the valve apparatus 100 except as described below. In this example embodiment, the valve apparatus 1000 includes a flow channel 1012 formed in the fluid-bearing layer 106 to substantially avoid thermal coupling with the two hot Peltier junctions 124, 126. In this example embodiment, the flow channel 1012 is formed with a turning flow path as shown.

Figure 11A:
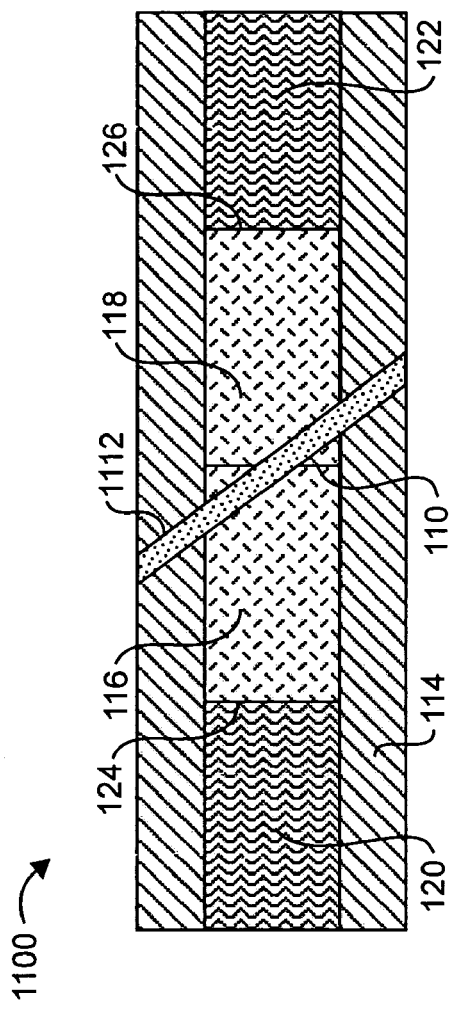
FIG. 11A is a top view of an example embodiment of a valve apparatus with a flow channel that diagonally traverses the linear thermoelectric junction in its conduction layer.
Figure 11B:
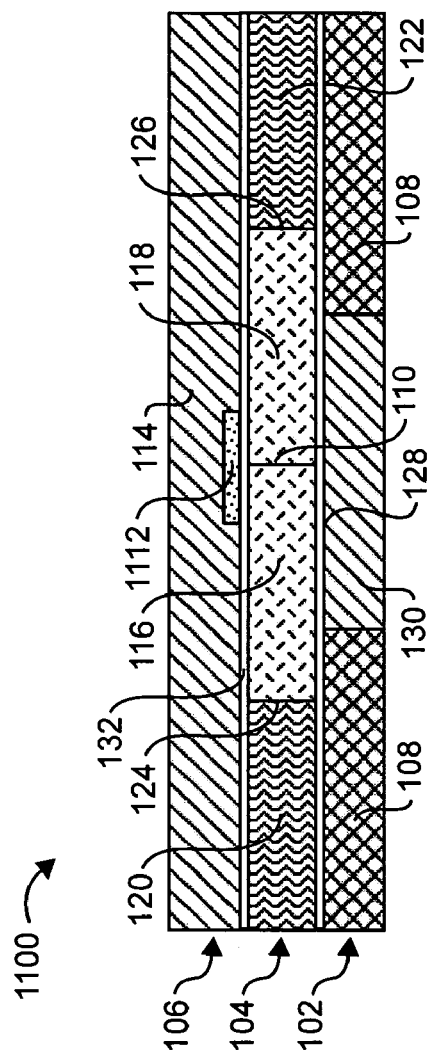
FIG. 11B is a cross-sectional view of the valve apparatus of FIG. 11A.

Referring to FIGS. 11A and 11B, an example embodiment of a valve apparatus 1100 is the same as the valve apparatus 100 except as described below. In this example embodiment, the valve apparatus 1100 includes a flow channel 1112 that diagonally traverses the linear thermoelectric junction 110.

With careful alignment, it is even possible to have the flow path traverse the junction parallel to the plane of the junction. Referring to FIGS. 12A and 12B, an example embodiment of a valve apparatus 1200 is the same as the valve apparatus 100 except as described below. In this example embodiment, the valve apparatus 1200 includes a flow channel 1212 that is symmetrically positioned in relation to the linear thermoelectric junction 110. In such a configuration, the flow channel 1212 may be smaller in area but the longer freeze area (along the junction) allows the valve to run at a higher flow rate and to withstand higher pressure.

A flow path oriented as illustrated in FIG. 12 must be narrow enough that the whole of the flow path is within the cold zone generated by the cold junction. By way of example, a linear junction with 300 micron legs will be cold enough the freeze water along a length of about 200 microns (100 microns either side of the plane of the junction). If a flow channel is only 100 microns wide and well aligned with the junction line, then the fluid will freeze along the entire length of the channel that is over the junction. If the junction is 1 mm wide, then the resulting ice plug will fill the entire cross section of the flow channel over a length of 1 mm. This provides the added advantage of increasing the pressure standoff capability of the valve, and increasing the ability to close a valve with a rapidly flowing fluid.

Traditional thermoelectric materials, such as bismuth telluride, have relatively low thermal conductivity compared, for example, to metals. Silver and copper each have thermal conductivities that are at least two orders of magnitude higher than that of bismuth telluride. When the flow channel is adjacent to only one side of the linear junction, the cooling power of the bulk of the junction is not directly exposed to the liquid because of the low thermal conductivity of the bismuth telluride. The embodiments described below include structures configured to provide good thermal contact between the cold junction and the fluid.

Referring to FIGS. 13A and 13B, an example embodiment of a valve apparatus 1300 is the same as the valve apparatus 400 except as described below. In this example embodiment, the conduction layer 404 includes a high thermal conductivity metal 1302 sandwiched between the n-type and p-type thermoelectric materials 416 and 418. In this example embodiment, a thin layer of a high conductivity metal, such as silver or copper, is sandwiched between the n- and p-type thermoelectric materials. This divides the cold junction in half, creating two cold junctions on either side of the thin metal layer.

Referring to FIGS. 13C and 13D, an example embodiment of a valve apparatus 1300' is the same as the valve apparatus 1300 except as described below. In this example embodiment, the heat-sink layer 402 includes a thermally insulating portion 1304 facing the high thermal conductivity metal 1302. By recessing the heat sink under the cold junctions in this manner, loss of cooling power through the heat sink is prevented or lessened.

Referring to FIGS. 13E and 13F, an example embodiment of a valve apparatus 1300" is the same as the valve apparatus 1300' except as described below. In this example embodiment, the high thermal conductivity metal 1302' is wider at an edge of the conduction layer 404 facing the fluid-bearing layer 406 (e.g., a small horizontal layer of high thermal conductivity metal along the surface of the cold junction as shown). This spreads the cold zone over a greater length of the flow channel 412 to make a larger ice plug.

Theory indicates that the maximum temperature difference between the hot and cold junctions of a thermoelectric device is independent of the geometry of the device. This, however, applies to steady state conditions. For transient behavior, the rate of cooling at the cold junction is a function of current density. According to various embodiments of the present invention, a device geometry is provided that increases the current density at the cold junction without increasing the current density at the hot junction, e.g., by making the cold junction smaller than the hot junction (or junctions).

FIGS. 14A-14F shows three configurations of a linear junction having reduced cross-section at the cold junction, while maintaining one planar face for mating with the fluid-bearing channels. These figures show junctions with planar cutouts to provide tapering in two or three dimensions. These devices can provide a cold junction having an area between 10 and 100% of the area of the hot junctions. The material removed from the linear junctions is replaced, for example, with a thermally insulating material to minimize heat loading on the cold junction.

Figure 14A:
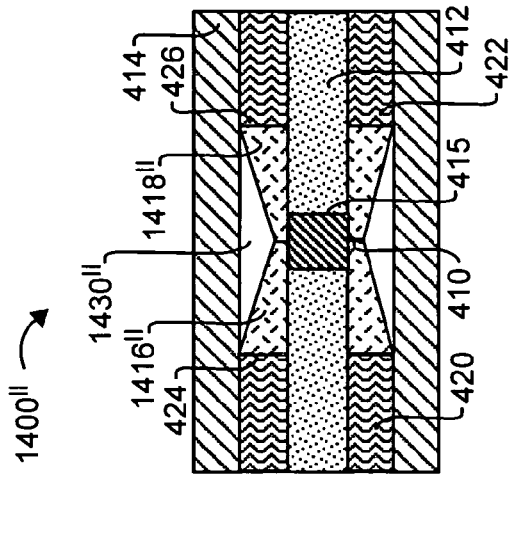
FIG. 14A is a top view of an example embodiment of a valve apparatus with a conduction layer that includes a vertically tapered thermoelectric material providing the conduction layer with a thermally insulating portion.
Figure 14C:
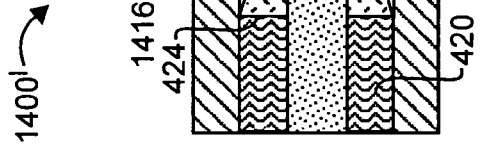
FIG. 14C is a top view of an example embodiment of a valve apparatus with a conduction layer that includes a horizontally tapered thermoelectric material providing the conduction layer with a thermally insulating portion.
Figure 14E:
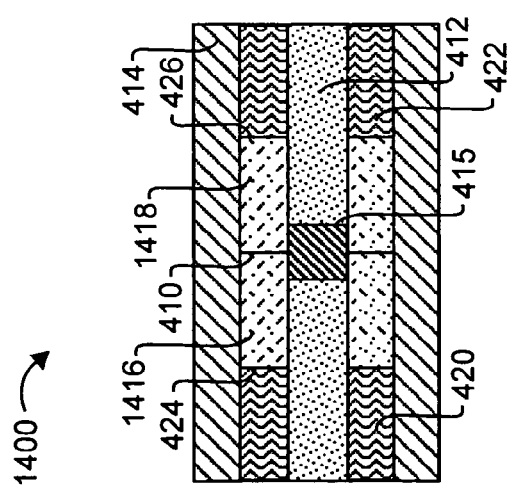
FIG. 14E is a top view of an example embodiment of a valve apparatus with a conduction layer that includes a vertically and horizontally tapered thermoelectric material providing the conduction layer with a thermally insulating portion.
Figure 14B:
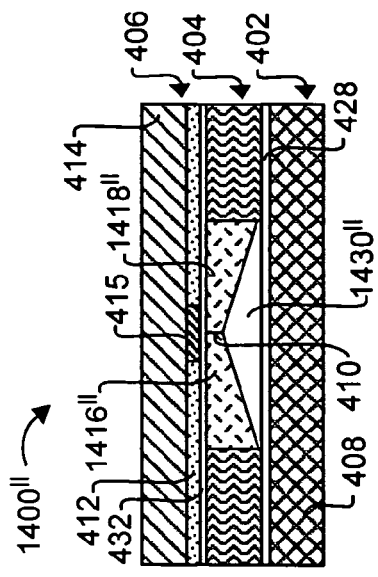
FIG. 14B is a cross-sectional view of the valve apparatus of FIG. 14A.

Referring to FIGS. 14A and 14B, an example embodiment of a valve apparatus 1400 is the same as the valve apparatus 400 except as described below. In this example embodiment, the conduction layer 404 includes vertically tapered thermoelectric materials 1416 and 1418, which provide the conduction layer 404 with a thermally insulating portion 1430 as shown. In this example embodiment, the thermally insulating portion 1430 separates the cold Peltier junction from the heat-sink layer.

Figure 14D:
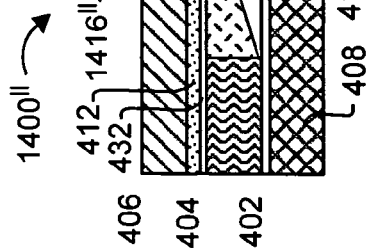
FIG. 14D is a cross-sectional view of the valve apparatus of FIG. 14C.

Referring to FIGS. 14C and 14D, an example embodiment of a valve apparatus 1400' is the same as the valve apparatus 1400 except as described below. In this example embodiment, the conduction layer 404 includes horizontally tapered thermoelectric materials 1416' and 1418' which provide the conduction layer 404 with a thermally insulating portion 1430' as shown.

Figure 14F:
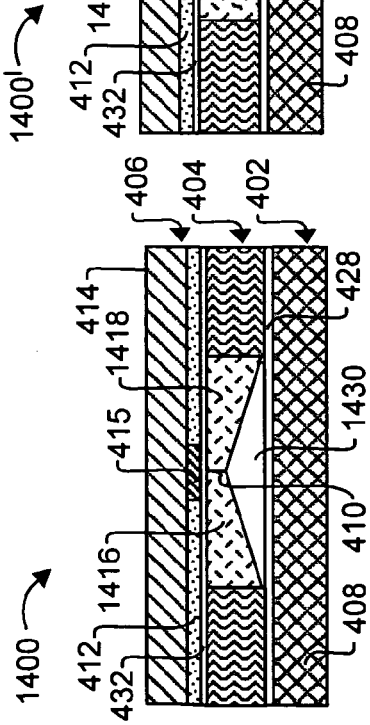
FIG. 14F is a cross-sectional view of the valve apparatus of FIG. 14E.

Referring to FIGS. 14E and 14F, an example embodiment of a valve apparatus 1400" is the same as the valve apparatus 1400' except as described below. In this example embodiment, the conduction layer 404 includes vertically and horizontally tapered thermoelectric materials 1416'' and 1418'' providing the conduction layer 404 with a thermally insulating portion 1430'' as shown.

In addition to varying the geometry to modify the cold-side current density, according to various embodiments of the present invention, the geometry can be modified to remove the hot junction from areas where it might affect fluid temperature.

Referring to FIGS. 15A and 15B, an example embodiment of a valve apparatus 1500 is the same as the valve apparatus 400 except as described below. In this example embodiment, the junction is formed in a chevron shape such that the hot junction between the thermoelectric material and the metal contacts is recessed from the planar surface where the fluid-bearing channels are located. In this example embodiment, conduction layer 404 includes chevron-shaped thermoelectric materials 1516 and 1518 which provide the conduction layer 404 with thermally insulating portions 1530 and 1531 as shown. In this example embodiment, the thermally insulating portion 1530 separates the cold Peltier junction from the heat-sink layer, and the thermally insulating portion 1531 separates the hot Peltier junctions from the fluid-bearing layer 406.

Referring to FIGS. 15C and 15D, an example embodiment of a valve apparatus 1500' is the same as the valve apparatus 1500 except as described below. In this example embodiment, the metal contacts 420' and 422' are also recessed to provide a thermally insulating portion 1531' that extends along the conduction layer 404 past the hot Peltier junctions. In an example embodiment, the thermally insulating portion 1531' extends along the conduction layer 404 beyond at least one of the two hot Peltier junctions. The thermally insulating portion 1531' (e.g., plastic or glass) keeps the hot side junction away from the fluid, allowing more overdriving.

Referring to FIGS. 15E and 15F, an example embodiment of a valve apparatus 1500'' is the same as the valve apparatus 1500' except as described below. In this example embodiment, the junction is also tapered, and has a high-conductivity metal insert 1532 to promote thermal contact between the cold junction and the fluid channel. In this example embodiment, conduction layer 404 includes tapered thermoelectric materials 1516' and 1518' which provide the conduction layer 404 with thermally insulating portions 1530' and 1531'' as shown. In an example embodiment, the conduction layer includes a high conductivity metal insert at the cold Peltier junction.

A key factor in the time required to cool a Peltier-actuated microvalve to the point of freezing the fluid in the valve is the initial temperature of the valve. Starting from a normal room temperature of 20 to 25 C., it is relatively easy to close a valve in 50 to 100 ms. If the valve is in an environment with a higher temperature, it gets progressively more difficult to generate a sufficient temperature difference to freeze the fluid. A way to avoid this difficulty is to mount the valve directly on a second thermoelectric module designed to keep the valve at an optimum operating temperature.

Figure 16A:
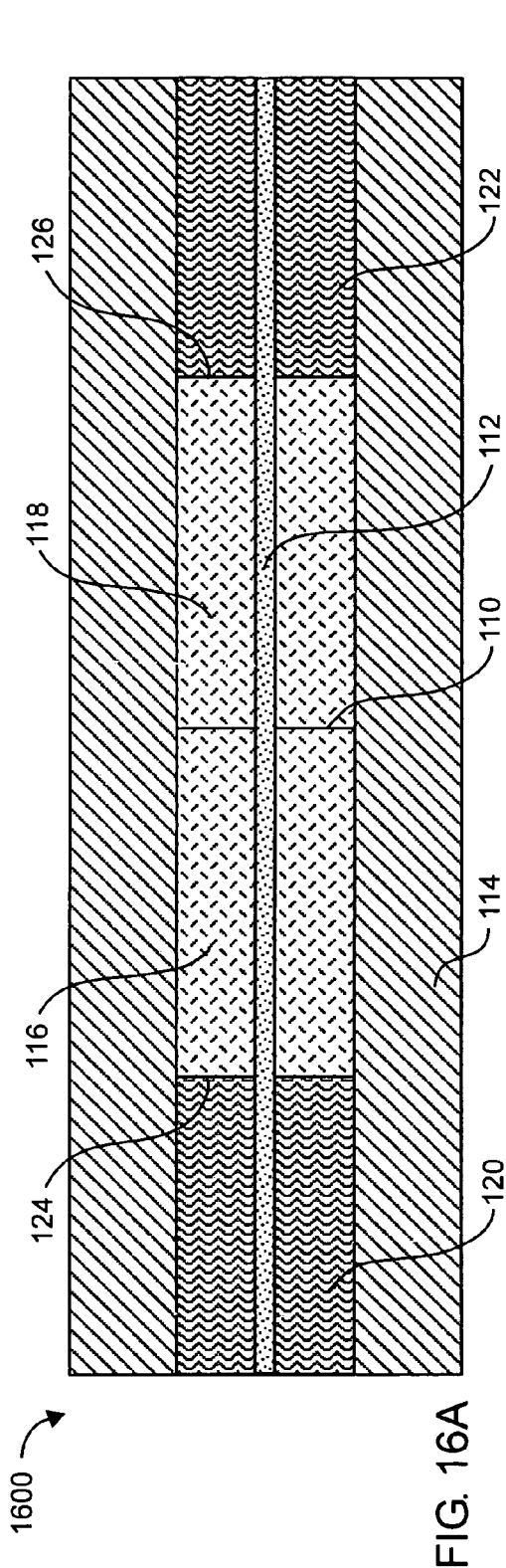
FIGS. 16A and 16B are top and cross-sectional views respectively of an example embodiment of a valve apparatus that includes a cooler thermally coupled to the heat-sink layer.
Figure 16B:
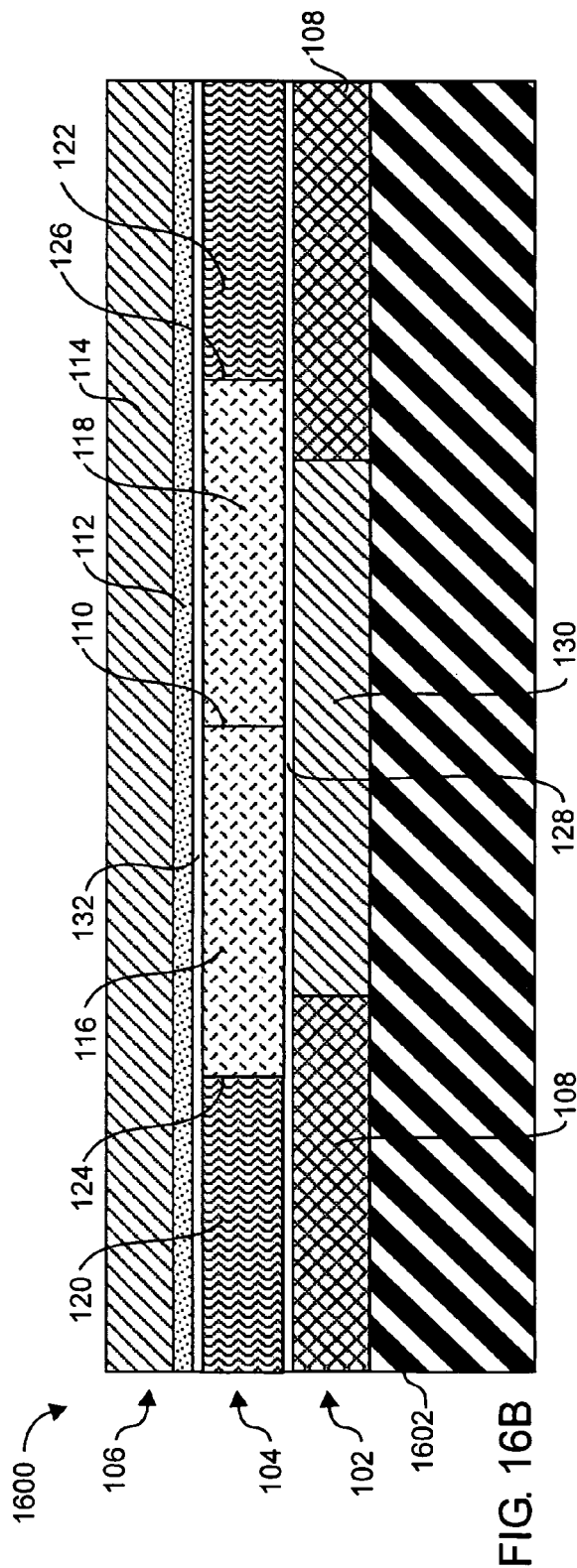

Referring to FIGS. 16A and 16B, an example embodiment of a valve apparatus 1600 is the same as the valve apparatus 100 except as described below. In this example embodiment, the valve apparatus 1600 includes a cooler 1602 (e.g., a second thermoelectric module) thermally coupled to the heat-sink layer. The second thermoelectric module does not need to be large; it is sufficient to have a local cool spot only slightly larger than the size of the linear junction used in the valve. Thus, a valve with a total junction length of 1 mm can be mounted on a cooling module only 2 mm square. If the fluid flowing in the valve can tolerate it, it is also possible to decrease the closing time of the valve by using the thermoelectric module to reduce the local temperature to a temperature just above freezing (e.g., 2 to 3 C.). The valve closing time can then be as short as 1 ms.

Figure 17A:
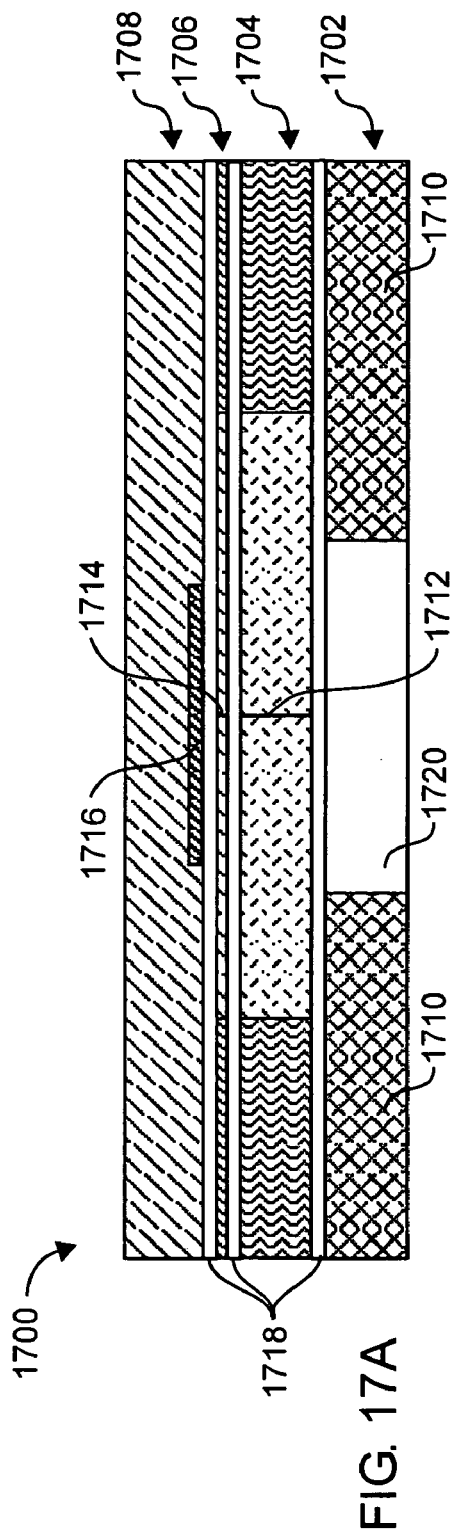
FIG. 17A is a cross-sectional view of an example embodiment of a valve apparatus that includes multiple conduction layers.

FIG. 17A shows an example embodiment of a valve apparatus 1700 that includes multiple conduction layers. In an example embodiment, a valve apparatus 1700 includes a heat-sink layer 1702, a first conduction layer 1704, a second conduction layer 1706, and a fluid-bearing layer 1708. The heat-sink layer 1702 includes a thermally conductive material 1710. The first conduction layer 1704 is thermally coupled to the heat-sink layer 1702 and includes a first linear thermoelectric junction 1712. The second conduction layer 1706 is thermally coupled to the first conduction layer 1704 and includes a second linear thermoelectric junction 1714 adjacent to the first linear thermoelectric junction 1712. The first and second conduction layers 1704 and 1706 are configured to temporarily operate in reverse directions to cool the first linear thermoelectric junction 1712 and heat the second linear thermoelectric junction 1714 before switching a current direction in the second conduction layer 1706 to cool the second linear thermoelectric junction 1714. The fluid-bearing layer 1708 includes a flow channel 1716 adjacent to and thermally coupled to the first and second linear thermoelectric junctions 1712 and 1714. Glass layers 1718 and an insulating portion 1720 are provided as described above with respect to other embodiments.

In operation, the two junctions are operated in reverse directions, with the lower junction operated in the forward direction to cool the region under the upper junction. At the same time the upper junction is operated in the reverse direction, creating a hot junction in line with the lower cold junction. With proper balancing of the dimensions and current densities in the two junctions, the net effect is to maintain the temperature of the fluid above the freezing point. When the time comes to close the valve, the current in the upper junction is rapidly switched from the reverse to the forward direction. Because the region below the upper junction is already well below ambient temperature, the switching time can be reduced.

Figure 17B:
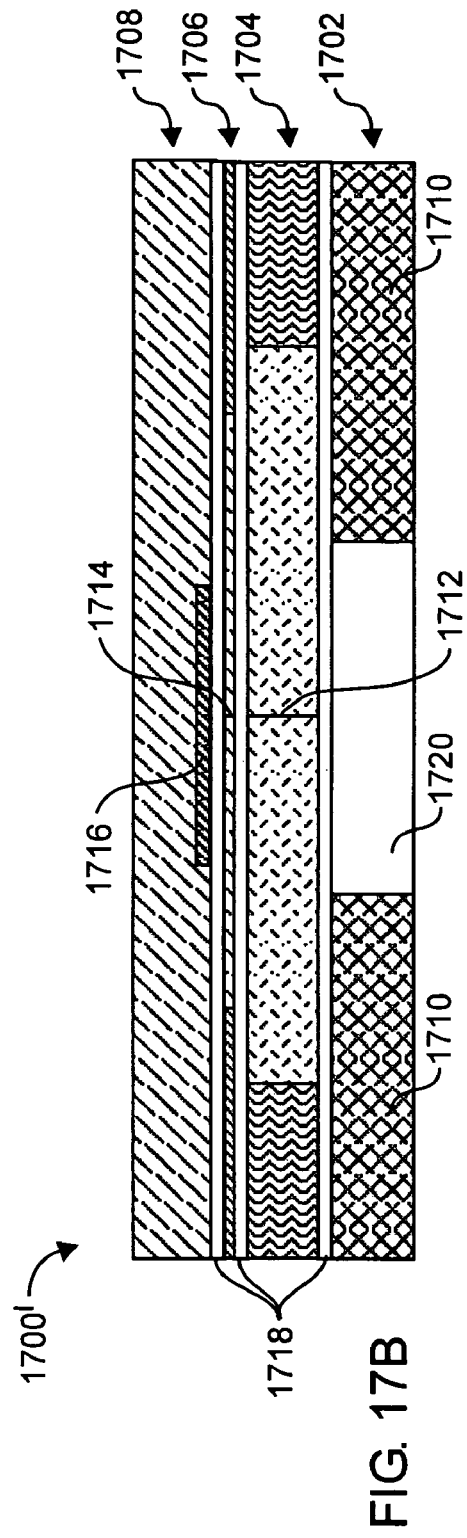
FIG. 17B is a cross-sectional view of an example embodiment of a valve apparatus that includes multiple conduction layers with respective linear thermoelectric junctions that differ in length.

Referring FIG. 17B, an example embodiment of a valve apparatus 1700' is the same as the valve apparatus 1700 except as described below. In this example embodiment, the linear thermoelectric junctions of the first and second conduction layers differ in length. In this example embodiment, the upper junction is made short and the lower junction is made longer, thereby allowing for a further reduction in switching time, while reducing the current requirement for the lower junction. In an example embodiment, the first linear thermoelectric junction 1712 is longer than the second linear thermoelectric junction 1714.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A valve apparatus comprising:
   a heat-sink layer including a thermally conductive material;
   a conduction layer thermally coupled to the heat-sink layer, the conduction layer including a linear thermoelectric junction,
   the linear thermoelectric junction having first and second hot thermoelectric junctions positioned laterally with respect to one another in a plane, and further having a cold thermoelectric junction positioned therebetween in the plane; and a fluid-bearing layer including a flow channel adjacent to and thermally coupled to the cold thermoelectric junction, the flow channel having microfluidic dimensions.

2. The valve apparatus of claim 1, wherein the heat-sink layer includes a thermally insulating portion facing the linear thermoelectric junction.

3. The valve apparatus of claim 1, wherein the conduction layer includes an n-type thermoelectric material and a p-type thermoelectric material, the cold thermoelectric junction being positioned therebetween in the plane.

4. The valve apparatus of claim 3, wherein the conduction layer includes a high thermal conductivity metal sandwiched between the n-type and p-type thermoelectric materials.

5. The valve apparatus of claim 4, wherein the heat-sink layer includes a thermally insulating portion facing the high thermal conductivity metal.

6. The valve apparatus of claim 4, wherein the high thermal conductivity metal is wider at an edge of the conduction layer facing the fluid-bearing layer.

7. The valve apparatus of claim 1, wherein the thermally conductive material is electrically insulating.

8. The valve apparatus of claim 1, wherein the thermally conductive material includes a ceramic material.

9. The valve apparatus of claim 1, further including: a layer of electrically insulating material between the heat-sink layer and the linear thermoelectric junction.

10. The valve apparatus of claim 9, wherein the thermally conductive material is electrically conductive.

11. The valve apparatus of claim 9, wherein the thermally conductive material includes aluminum.

12. The valve apparatus of claim 1, wherein a length of the linear thermoelectric junction is less than 1.5 mm.

13. The valve apparatus of claim 1, wherein a length of the linear thermoelectric junction is less than 0.5 mm.

14. The valve apparatus of claim 13, wherein the conduction layer, when electrically connected to a power source, permits a current density of at least 16 A/mm$^2$ at the linear thermoelectric junction.

15. The valve apparatus of claim 1, wherein the flow channel has a high aspect ratio.

16. The valve apparatus of claim 1, further including:
a thermally conductive barrier layer between the flow channel and the linear thermoelectric junction.

17. The valve apparatus of claim 1, wherein the conduction layer includes a thin film,
and further wherein the heat-sink layer includes a thermally insulating portion facing the linear thermoelectric junction.

18. The valve apparatus of claim 1, wherein the heat-sink layer and the conduction layer are part of a control module that includes control electronics.

19. The valve apparatus of claim 18, wherein the fluid-bearing layer is part of a fluid-bearing module that is detachably secured to the control module.

20. The valve apparatus of claim 1, wherein the heat-sink layer is part of a control module that includes control electronics.

21. The valve apparatus of claim 20, wherein the fluid-bearing layer and the conduction layer are part of a fluid-bearing module that is detachably secured to the control module.

22. The valve apparatus of claim 1, further including:
a thermally conductive protrusion formed over the linear thermoelectric junction.

23. The valve apparatus of claim 1, wherein the flow channel is formed in the fluid-bearing layer so as to cross the cold thermoelectric junction and to substantially avoid thermal coupling with the two hot thermoelectric junctions.

24. The valve apparatus of claim 1, wherein the flow channel diagonally traverses the linear thermoelectric junction.

25. The valve apparatus of claim 1, wherein the flow channel is symmetrically positioned in relation to the linear thermoelectric junction.

26. The valve apparatus of claim 1, wherein the cold thermoelectric junction is smaller in area than at least one of the first and second hot thermoelectric junctions.

27. The valve apparatus of claim 1, wherein the conduction layer includes a tapered thermoelectric material.

28. The valve apparatus of claim 1, wherein the conduction layer includes a thermally insulating portion.

29. The valve apparatus of claim 28, wherein the thermally insulating portion separates the cold Peltier junction from the heat-sink layer.

30. The valve apparatus of claim 28, wherein the thermally insulating portion separates at least one of the first and second hot thermoelectric junctions from the fluid-bearing layer.

31. The valve apparatus of claim 30, wherein the thermally insulating portion extends along the conduction layer beyond at least one of the first and second hot thermoelectric junctions.

32. The valve apparatus of claim 1, wherein the conduction layer includes a high conductivity metal insert at the cold thermoelectric junction.

33. The valve apparatus of claim 1, further including:
a cooler thermally coupled to the heat-sink layer.

34. A valve apparatus comprising:
a heat-sink layer including a thermally conductive material;
a conduction layer thermally coupled to the heat-sink layer, the conduction layer including a plurality of linear thermoelectric junctions,
each linear thermoelectric junction having first and second hot thermoelectric junctions positioned laterally with respect to one another in a plane, and further having a cold thermoelectric junction positioned therebetween in the plane; and
a fluid-bearing layer including a plurality of flow channels adjacent to and thermally coupled to the cold thermoelectric junctions, at least one of flow channels having microfluidic dimensions.

35. The valve apparatus of claim 34, wherein the conduction layer is defined in a single substrate, the first and second hot junctions and the cold junction of each linear thermoelectric junction being exposed at a planar surface of the conduction layer, that faces the fluid-bearing layer.

36. The valve apparatus of claim 34, wherein the linear thermoelectric junctions vary in length.

37. The valve apparatus of claim 34, wherein two of the linear thermoelectric junctions are configured to provide a combined valve where one junction decreases in temperature more rapidly than the other.

38. The valve apparatus of claim 34, wherein two of the linear thermoelectric junctions are configured to provide a combined valve where one junction experiences an overdrive condition while the other continues to decrease in temperature.

39. A valve apparatus comprising:
a heat-sink layer including a thermally conductive material;

a conduction layer thermally coupled to the heat-sink layer, the conduction layer including a linear thermoelectric junction; and a fluid-bearing layer including a flow channel adjacent to and thermally coupled to the linear thermoelectric junction, the flow channel having microfluidic dimensions, wherein the conduction layer includes n-type and p-type thermoelectric materials, which define the thermoelectric junction, wherein the conduction layer includes a high thermal conductivity metal sandwiched between the n-type and p-type thermoelectric materials, wherein the high thermal conductivity metal is wider at an edge of the conduction layer facing the fluid-bearing layer.

* * * * *